(12) United States Patent
Jeon et al.

(10) Patent No.: US 11,067,662 B2
(45) Date of Patent: Jul. 20, 2021

(54) ELECTRONIC DEVICE FOR VERIFYING RELATIVE LOCATION AND CONTROL METHOD THEREOF

(71) Applicant: Samsung Electronics Co., Ltd, Suwon-si (KR)

(72) Inventors: Jae Woong Jeon, Suwon-si (KR); Dong Hun Park, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 205 days.

(21) Appl. No.: 16/116,773

(22) Filed: Aug. 29, 2018

(65) Prior Publication Data

US 2019/0064312 A1 Feb. 28, 2019

(30) Foreign Application Priority Data

Aug. 31, 2017 (KR) ........................ 10-2017-0110694

(51) Int. Cl.
| | | |
|---|---|---|
| G01S 5/02 | (2010.01) | |
| G01S 13/48 | (2006.01) | |
| G01S 5/14 | (2006.01) | |
| G01S 13/76 | (2006.01) | |
| G01S 13/82 | (2006.01) | |
| G01S 11/06 | (2006.01) | |
| G01S 13/46 | (2006.01) | |

(52) U.S. Cl.
CPC .............. *G01S 5/0252* (2013.01); *G01S 5/14* (2013.01); *G01S 11/06* (2013.01); *G01S 13/48* (2013.01); *G01S 13/765* (2013.01); *G01S 13/825* (2013.01); *G01S 2013/466* (2013.01)

(58) Field of Classification Search
CPC ........ G01S 11/06; G01S 13/48; G01S 13/765; G01S 13/825; G01S 2013/466; G01S 3/043; G01S 3/48; G01S 5/0252; G01S 5/04; G01S 5/14
See application file for complete search history.

(56) References Cited

U.S. PATENT DOCUMENTS

| | | | |
|---|---|---|---|
| 9,813,867 B2 | 11/2017 | Prevatt | |
| 2010/0295732 A1* | 11/2010 | Lee | G01S 3/043 342/420 |
| 2015/0323643 A1* | 11/2015 | Hill | G01S 5/0221 370/252 |
| 2017/0192083 A1* | 7/2017 | Avitzour | G01S 5/0215 |
| 2019/0212426 A1* | 7/2019 | Samarao | G01S 13/06 |

\* cited by examiner

*Primary Examiner* — Timothy X Pham

(57) ABSTRACT

An electronic device may include a plurality of antennas, a memory storing at least one reference data, and a processor. The processor may be configured to obtain context information associated with a state of the electronic device, when the context information meets a first specified condition, determine phase difference information corresponding to signals obtained using the plurality of antennas based on first specified reference data, when the context information meets a second specified condition, determine phase difference information corresponding to signals obtained using the plurality of antennas based on second specified reference data, and determine a relative location of an external electronic device with respect to the electronic device based on the determined phase difference information.

14 Claims, 21 Drawing Sheets

GRAPH 1

GRAPH 3

GRAPH 4

ELECTRONIC DEVICE FOR VERIFYING RELATIVE LOCATION AND CONTROL METHOD THEREOF

CROSS-REFERENCE TO RELATED APPLICATIONS AND CLAIM OF PRIORITY

This application is based on and claims priority under 35 U.S.C. § 119 to Korean Patent Application No. 10-2017-0110694 filed on Aug. 31, 2017 in the Korean Intellectual Property Office, the disclosure of which is incorporated herein by reference its entirety.

BACKGROUND

1. Field

The present disclosure relates to positioning technologies using an angle of arrival (AOA).

2. Description of Related Art

An electronic device may verify a relative location of a target device (a device which transmits a signal) with respect to the electronic device by detecting an angle of arrival (AOA) of a received signal.

The electronic device may determine a relative location (e.g., a direction) of the target device using a phase difference between signals received through its plurality of antennas. The electronic device may determine a phase difference between the received signals using an AOA of a signal received using each of the plurality of antennas.

The above information is presented as background information only to assist with an understanding of the present disclosure. No determination has been made, and no assertion is made, as to whether any of the above might be applicable as prior art with regard to the present disclosure.

SUMMARY

A relative location of a target device with respect to an electronic device may be differently verified according to a state of the electronic device. Thus, there may be an error in the relative location of the target device with respect to the electronic device, which is verified without regard to a state of the electronic device.

Aspects of the present disclosure are to address at least the above-mentioned problems and/or disadvantages and to provide at least the advantages described below. Accordingly, an aspect of the present disclosure is to provide an electronic device for verifying a relative location and a control method thereof.

In accordance with an aspect of the present disclosure, an electronic device is provided. The electronic device may include a plurality of antennas, a memory storing at least one reference data, and a processor. The processor may be configured to obtain context information associated with a state of the electronic device, when the context information meets a first specified condition, determine phase difference information corresponding to signals obtained using the plurality of antennas based on first specified reference data, when the context information meets a second specified condition, determine phase difference information corresponding to signals obtained using the plurality of antennas based on second specified reference data, and determine a relative location of an external electronic device with respect to the electronic device based on the determined phase difference information.

In accordance with another aspect of the present disclosure, an electronic device is provided. The electronic device may include first to third antennas, a memory storing a plurality of look-up tables (LUTs), and a processor configured to be electrically connected with the first to third antennas and the memory. The processor may be configured to, when an angle of arrival (AOA) function is executed, verify an event associated with a state of the electronic device, obtain an LUT corresponding to the state of the electronic device among the plurality of LUTs stored in the memory, obtain a phase difference between first to third signals which are transmitted from another electronic device and are received using the first to third antennas, determine a relative location of the other electronic device with respect to the electronic device corresponding to the phase between the first to third signals, based on phase difference information included in the obtained LUT, and store the determined relative location in the memory.

In accordance with another aspect of the present disclosure, a control method of an electronic device is provided. The method may include when an AOA function is executed, verifying an event associated with a state of the electronic device, obtaining an LUT corresponding to the state of the electronic device among a plurality of LUTs stored in a memory of the electronic device, verifying a phase difference between first to third signals which are transmitted from another electronic device and are received using first to third antennas included in the electronic device, determining a relative location of the other electronic device with respect to the electronic device corresponding to the phase difference between the first to third signals, based on phase difference information included in the obtained LUT, and storing the determined relative location.

According to embodiments disclosed in the present disclosure, the electronic device may increase the accuracy of a relative location determined using an AOA. In addition, various effects directly or indirectly ascertained through the present disclosure may be provided.

Other aspects, advantages, and salient features of the disclosure will become apparent to those skilled in the art from the following detailed description, which, taken in conjunction with the annexed drawings, discloses various embodiments of the present disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document. Those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
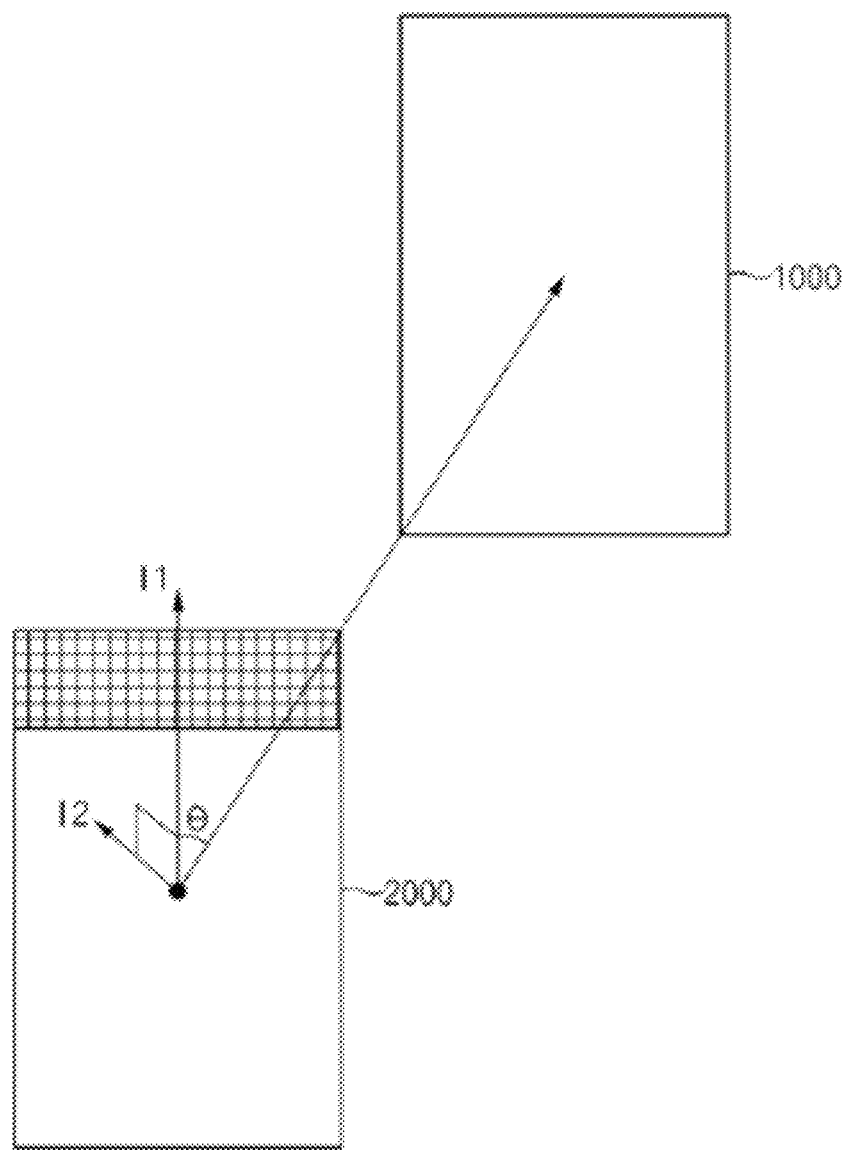
FIG. 1 is a drawing illustrating a relationship between an electronic device and a target device according to an embodiment.

FIGS. 1 through 21, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, certain embodiments of the present disclosure may be described with reference to accompanying drawings. Accordingly, those of ordinary skill in the art will recognize that modifications, equivalents, and/or alternatives on the various embodiments described herein may be made without departing from the scope and spirit of the present disclosure.

The terms of a singular form may include plural forms unless otherwise specified. In the present disclosure, the expressions "A or B", "at least one of A and/or B", "A, B, or C", or at least one of "A, B and/or C" may include all possible combinations of one or more of the associated listed items. The terms such as "first", "second", and the like used herein may refer to various elements regardless of the order and/or priority of the elements and may be used to distinguish an element from another element, not to limit the elements. It will be understood that when an element (e.g., a first element) is referred to as being "(operatively or communicatively) coupled with/to" or "connected to" another element (e.g., a second element), the element may be directly coupled with/to or connected to the another element or an intervening element (e.g., a third element) may be present there between.

In the present disclosure, according to the situation, the expression "adapted to or configured to" used herein may be interchangeably used with, for example, the expression "suitable for", "having the capacity to", "changed to", "made to", "capable of" "designed to", or "adapted to". Under a certain situation, the expression "a device configured to" may mean that the device is "capable of" operating together with another device or other components. For example, a "processor configured to (or adapted to) perform A, B, and C" may mean a dedicated processor (e.g., an embedded processor) for performing a corresponding operation or a generic-purpose processor (e.g., a central processing unit (CPU) or an application processor) which may perform corresponding operations by executing one or more software programs which are stored in a memory device.

Terms used in various embodiments of the present disclosure are used to describe certain embodiments of the present disclosure, but are not intended to limit the scope of other embodiments. The terms of a singular form may include plural forms unless they have a clearly different meaning in the context. Otherwise, all terms used herein may have the same meanings that are generally understood by a person skilled in the art. In general, terms defined in a dictionary should be considered to have the same meanings as the contextual meaning of the related art, and, unless clearly defined herein, should not be understood differently or as having an excessively formal meaning. In any case, even the terms defined in the present specification are not intended to be interpreted as excluding embodiments of the present disclosure.

An electronic device according to various embodiments of the present disclosure may include at least one of a smartphone, a tablet personal computer (PC), a mobile phone, a video telephone, an electronic book reader, a desktop PC, a laptop PC, a netbook computer, a workstation, a server, a personal digital assistant (PDA), a portable multimedia player (PMP), a Motion Picture Experts Group (MPEG-1 or MPEG-2) Audio Layer 3 (MP3) player, a mobile medical device, a camera, or a wearable device. The wearable device may include at least one of an accessory-type device (e.g., a watch, a ring, a bracelet, an anklet, a necklace, glasses, a contact lens, a head-mounted device (HMD)), a textile- or clothing-integrated-type device (e.g., an electronic apparel), a body-attached-type device (e.g., a skin pad or a tattoo), or a bio-implantable-type device (e.g., an implantable circuit).

In some various embodiments of the present disclosure, an electronic device may be a home appliance. The smart home appliance may include at least one of, for example, a television (TV), a digital video/versatile disc (DVD) player, an audio, a refrigerator, an air conditioner, a cleaner, an oven, a microwave oven, a washing machine, an air cleaner, a set-top box, a home automation control panel, a security control panel, a television (TV) box (e.g., Samsung HomeSync™, Apple TV™, or Google TV™), a game console (e.g., Xbox™ or PlayStation™), an electronic dictionary, an electronic key, a camcorder, or an electronic picture frame.

In other various embodiments of the present disclosure, an electronic device may include at least one of various medical devices (e.g., various portable medical measurement devices (e.g., a blood glucose measuring device, a heart rate measuring device, a blood pressure measuring device, a body temperature measuring device, or the like), a magnetic resonance angiography (MRA), a magnetic resonance imaging (MRI), a computed tomography (CT), a scanner, an ultrasonic device, or the like), a navigation device, a global navigation satellite system (GNSS), an event data recorder (EDR), a flight data recorder (FDR), a vehicle infotainment device, electronic equipment for vessels (e.g., a navigation system, a gyrocompass, or the like), avionics, a security device, a head unit for a vehicle, an industrial or home robot, an automatic teller machine (ATM), a point of sales (POS) device of a store, or an Internet of things (IoT) device (e.g., a light bulb, various sensors, an electric or gas meter, a sprinkler, a fire alarm, a thermostat, a streetlamp, a toaster, exercise equipment, a hot water tank, a heater, a boiler, or the like).

According to various embodiments of the present disclosure, an electronic device may include at least one of a part of furniture or a building/structure, an electronic board, an electronic signature receiving device, a projector, or a measuring instrument (e.g., a water meter, an electricity meter, a gas meter, a wave meter, or the like). An electronic device may be one or more combinations of the above-mentioned devices. An electronic device according to some various embodiments of the present disclosure may be a flexible device. An electronic device according to an embodiment of the present disclosure is not limited to the above-mentioned devices, and may include new electronic devices with the development of new technology.

Hereinafter, an electronic device according to various embodiments of the present disclosure will be described in more detail with reference to the accompanying drawings. The term "user" used herein may refer to a person who uses an electronic device or may refer to a device (e.g., an artificial intelligence electronic device) that uses an electronic device.

FIG. 1 is a drawing illustrating a relationship between an electronic device and a target device according to an embodiment.

According to an embodiment, an electronic device 2000 may determine information about a reference phase difference corresponding to each relative location of a target device 1000 through a calibration process for an angle of arrival (AOA) function. For example, the reference phase difference information may be determined to correspond to each relative location of the target device 1000 through a process of verifying a phase difference between signals received from the target device 1000 while changing a relative location of the target device 1000. The calibration process may be performed in, for example, a process of manufacturing the electronic device 2000.

According to an embodiment, the electronic device 2000 may determine a relative location (e.g., direction) of the target device 1000 by comparing a phase difference between signals received through a plurality of antennas with the reference phase difference information. The phase difference between the received signals may be determined using an AOA of each of the received signals. The relative location of the target device 1000 may include, for example, a heading angle θ of the target device 1000 with respect to a first line l1 which faces a heading of the electronic device 2000. The first line l1 may be a line which is perpendicular to a second line l2 perpendicular to a horizontal line which passes through one point on the electronic device 2000 and faces the heading of the electronic device 2000. The heading may be, for example, a direction facing an upper end of the electronic device 2000.

In an embodiment, the determined relative location may be differently measured according to a state of an antenna of the electronic device 2000, a tilt of the electronic device 2000, or a state of a cover mounted on the electronic device 2000. For example, at least one of a plurality of antennas of the electronic device 2000 may be shared for another communication. In this case, at least one of lengths or the volume of a shared antenna may be changed in the process shared for the other communication. Such a change may cause a phase shift in a signal received through the shared antenna. For another example, a tilt of the electronic device 2000 when executing an AOA function may differ from a tilt when verifying reference phase difference information. Such a tilt difference may cause a phase shift in a received signal. For another example, at least a portion of the electronic device 2000 may be hidden by a cover. For example, the cover may be a cover of metal materials or plastic materials, which covers at least in part a rear surface of the electronic device 2000. Permittivity of the cover may cause a phase shift in a signal received using the plurality of antennas. The above-mentioned phase shifts may cause an error in a relative location of the target device 1000, verified using a phase difference between received signals.

Figure 2:
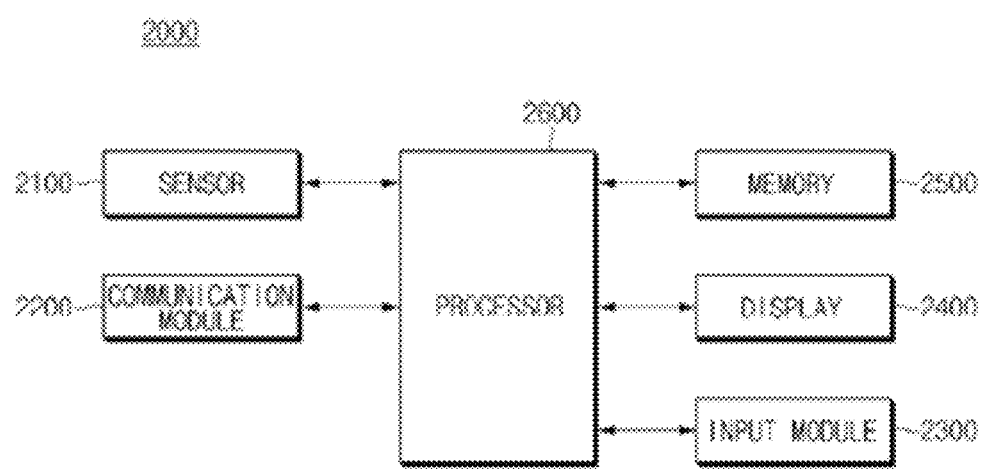
FIG. 2 is a block diagram illustrating a configuration of an electronic device for executing an angle of arrival (AOA) function according to an embodiment.

FIG. 2 is a block diagram illustrating a configuration of an electronic device for executing an AOA function according to an embodiment.

Referring to FIG. 2, an electronic device 2000 which executes an AOA function according to an embodiment may include a sensor 2100, a communication module 2200 (or a communication circuit), an input module 2300 (or an input circuit or an input device), a display 2400, a memory 2500, and a processor 2600. In an embodiment, the electronic device 2000 may fail to include some of the elements or may further include other element(s). In an embodiment, some of the elements of the electronic device 2000 may be combined with each other to be configured as one entity. The electronic device 2000 may perform functions of the elements before the combination in the same manner.

According to an embodiment, the sensor 2100 may sense a tilt of the electronic device 2000. For example, the sensor 2100 may be a gyro sensor capable of sensing a 3-axis tilt of the electronic device 2000. The sensor 2100 may be driven (e.g., turned on) or may fail to be driven (e.g., turned off), according to instructions of the processor 2600.

According to an embodiment, the communication module 2200 may include a plurality of communication circuits. For example, the communication module 2200 may include a first communication circuit for short-range communication. The communication module 2200 associated with the short-range communication may include at least one of, for example, a Bluetooth communication circuit, a Bluetooth low energy (BLE) communication circuit, or a wireless-fidelity (Wi-Fi) direct communication circuit. For another example, the communication module 2200 may include at least one second communication circuit for another communication. The other communication may include long-range communication such as at least one of 3 generation (3G) or long term evolution (LTE). For another example, the communication module 2200 may include a reader circuit capable of reading information stored in a tag. The tag may be formed on, for example, a cover of the electronic device 2000.

According to an embodiment, the communication module 2200 may include a plurality of antennas for at least one of short-range communication or long-range communication. At least one of the plurality of antennas may be a shared antenna shared for the short-range communication or the long-range communication. In the present disclosure hereafter, an embodiment is exemplified as the communication module 2200 includes three antennas (first to three antennas). A description will be given below of a detailed configuration of the communication module 2200.

According to an embodiment, the input module 2300 may receive a user input. For example, the input module 2300 may include at least one of a touch sensor or an input button. The touch sensor may be installed in the display 2400 (e.g., a touch screen display). The user input may include, for example, a user input for requesting to execute an AOA function.

The display 2400 may include, for example, a liquid crystal display (LCD), a light emitting diode (LED) display, an organic LED (OLED) display, or an electronic paper display. The display 2400 may display, for example, a variety of content (e.g., a text, an image, a video, an icon, a symbol, and/or the like) to a user. The display 2400 may be, for example, a touch screen display. According to an embodiment, the display 2400 may display information about an AOA function based on instructions of the processor 2600. The information about the AOA function may include, for example, a relative location of a target device 1000 of FIG. 1.

The memory 2500 may be a volatile memory (e.g., a random access memory (RAM) or the like), a nonvolatile memory (e.g., a read only memory (ROM), a flash memory, or the like), or a combination thereof. The memory 2500 may store instructions or data associated with at least one other element(s) of the electronic device 2000. According to an embodiment, the memory 2500 may include a plurality of look-up tables (LUTs) corresponding to different states of the electronic device 2000. The state of the electronic device 2000 may include at least one of, for example, an antenna state of the electronic device 2000, a tilt state of the electronic device 2000, or a cover state of the electronic device 2000. Each of the plurality of LUTs may include phase difference information corresponding to each relative location of the target device 1000. The phase difference information may be determined through an experiment (e.g., a calibration process) of verifying a relative location (e.g., a relative direction) of the target device 1000 with respect to the electronic device 2000. The phase difference information may be determined as the electronic device 2000 verifies a phase difference between signals received from the target device 1000 while changing a relative location of the target device 1000 with a state of the electronic device 2000 fixed or while changing a direction of the electronic device 2000 with the target device 1000 fixed. The antenna state may include a state of at least one of a volume or a length of an antenna, which is set in connection with a cover of a specified frequency band.

The processor 2600 may include at least one of, for example, a central processing unit (CPU), a graphic processing unit (GPU), a microprocessor, a call processor, an application processor, an application specific integrated circuit (ASIC), or field programmable gate arrays (FPGA) and may have a plurality of cores. The processor 250 may execute an arithmetic operation or data processing associated with control and/or communication of at least one other element(s) of the electronic device 2000.

According to an embodiment, the processor 2600 may execute an AOA function. For example, when verifying that a user input for requesting to execute the AOA function is received from the input module 2300, the processor 2600 may execute the AOA function. For another example, the processor 2600 may execute the AOA function depending on a request of an executed application.

According to an embodiment, when the AOA function is executed, the processor 2600 may verify context information (an event) associated with a state of the electronic device 2000. The context information (the event) (hereinafter referred to as "event") may be associated with at least one of, for example, an antenna state, a tilt state, or a cover state of the electronic device 2000. In an embodiment, the processor 2600 may obtain a look-up table (LUT) corresponding to a state of the electronic device 2000 among a plurality of reference data (e.g., look-up tables (LUTs)) (hereinafter referred to as "LUTs") stored in the memory

2500. The obtained LUT may be used to verify a relative location of the target device 1000.

According to an embodiment, the processor 2600 may receive a signal transmitted using short-range communication from the target device 1000 using each of first to third antennas. For example, the processor 2600 may transmit a signal to the target device 1000 through a first antenna in a first transmit period and may receive a first signal, transmitted from the target device 1000, through the first antenna. The processor 2600 may transmit a signal to the target device 1000 through a second antenna in a second transmit period and may receive a second signal, transmitted from the target device 1000, through the second antenna. The processor 2600 may transmit a signal to the target device 1000 through a third antenna in a third transmit period and may receive a third signal, transmitted from the target device 1000, through the third antenna. For another example, the processor 2600 may receive the first signal from the target device 1000 through the first antenna in the first transmit period. The processor 2600 may receive the second signal from the target device 1000 through the second antenna in the second transmit period. The processor 2600 may receive the third signal from the target device 1000 through the third antenna in the third transmit period.

According to an embodiment, the processor 2600 may verify a phase of each of the received first to third signals and may verify a phase difference between the first to third signals. The phase difference between the first to third signals may include a phase difference between the first signal and the second signal, a phase difference between the second signal and the third signal, and a phase difference between the third signal and the first signal. The processor 2600 may compare phase difference information included in an LUT corresponding to the obtained state of the electronic device 2000 with a phase difference between the first to third signals and may determine a relative location of the target device 1000 with respect to the electronic device 2000. For example, the processor 2600 may determine a relative location, corresponding to information about the same phase difference as a phase difference between the first to third signals among a plurality of phase difference information included in an obtained LUT, as a relative location of the target device 1000. The relative location may be, for example, a heading angle of the target device 1000 with respect to the electronic device 2000.

According to an embodiment, the processor 2600 may store the determined relative location in the memory 2500. According to an embodiment, the processor 2600 may output the determined relative location on the display 2400. For example, the processor 2600 may output an indication (e.g., an arrow) indicating a direction of the target device 1000 on the display 2400 such that a user of the electronic device 2000 knows a relative location of the target device 1000. For example, when an object corresponding to the target device 1000 on a screen which displays a relative location of the target device 1000 is selected, the processor 2600 may output a menu screen associated with controlling the selected object.

The processor 2600 according to an embodiment may more accurately determine a relative location of the target device 1000 by determining the relative location of the target device 1000 using an LUT corresponding to a state of the electronic device 2000.

In the above-mentioned embodiment, an embodiment is exemplified as the processor 2600 verifies a relative direction of the target device 1000. The processor 2600 may verify a separation distance from the target device 1000 with respect to the electronic device 2000. For example, the processor 2600 may verify a separation distance from the target device 1000 using strength of each of the first to third signals. For another example, the processor 2600 may verify a separation distance from the target device 1000 based on a time when the first to third signals are transmitted and received. The processor 2600 may display the verified separation distance on the display 2400.

In the above-mentioned embodiment, an embodiment is exemplified as the processor 2600 verifies a relative location of the target device 1000 using the three antennas. However, embodiments are not limited thereto. For example, the processor 2600 may verify a relative location of the target device 1000 using two antennas or more than three antennas.

In the above-mentioned embodiment, an embodiment is exemplified as the processor 2600 obtains an LUT corresponding to a state of the electronic device 2000 and receives a signal, transmitted from the target device 1000, using the first to third antennas. However, embodiments are not limited thereto. For example, after receiving a signal using the first to third antennas, the processor 2600 may obtain an LUT corresponding to a state of the electronic device 2000.

Figure 3:
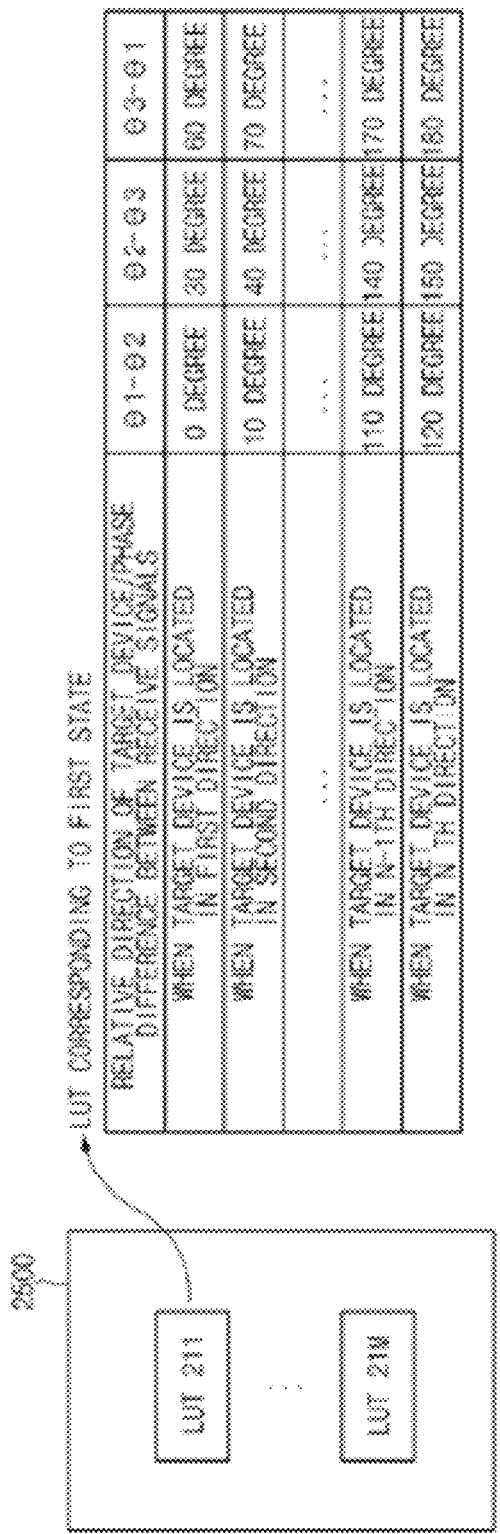
FIG. 3 is a drawing illustrating a plurality of look-up tables (LUTs) according to an embodiment.

FIG. 3 is a drawing illustrating a plurality of reference data (e.g., a plurality of LUTs) according to an embodiment. Phase difference information shown in FIG. 3 is, but is not limited to, only an example for illustrative purposes.

Referring to FIG. 3, a memory 2500 may store a plurality of LUTs 211 to 21*m* (m 2) corresponding to different states of an electronic device 2000 of FIG. 1. The state of the electronic device 2000 may include at least one of a state of an antenna included in the electronic device 2000, a tilt state of the electronic device 2000, or a state where a cover of the electronic device 2000 is mounted.

Referring to FIG. 3, the LUT 211 corresponding to a first state of the electronic device 2000 may include phase difference information between first to third signals corresponding to when a target device 1000 of FIG. 1 is located in first to nth directions with respect to the electronic device 2000. The phase difference information between the first to third signals may include phase difference information ($\theta_1 - \theta_2$) between the first signal and the second signal, phase difference information ($\theta_2 - \theta_3$) between the second signal and the third signal, and phase difference information ($\theta_3 - \theta_1$) between the third signal and the first signal.

In FIG. 3, an embodiment is exemplified as the LUT includes the phase difference information between the first to third signals. However, embodiments are not limited thereto. For example, the LUT may store a phase difference rate of the first to third signals.

Figure 4:
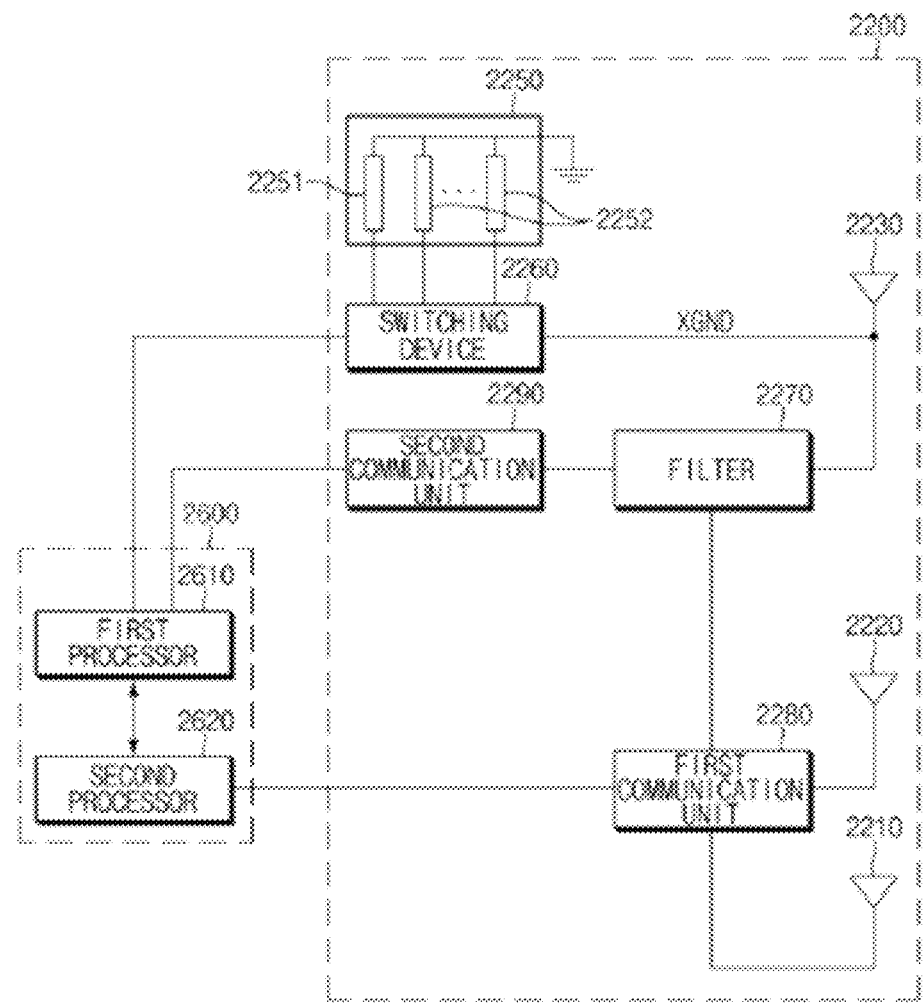
FIG. 4 is a block diagram illustrating a detailed configuration of each of a processor and a communication module according to an embodiment.

FIG. 4 is a block diagram illustrating a detailed configuration of each of a processor (e.g., a processor 2600 of FIG. 2) and a communication module (e.g., a communication module 2200 of FIG. 2) according to an embodiment.

Referring to FIG. 4, according to an embodiment, the communication module 2200 may include first to three antennas 2210, 2220, and 2230, a plurality of tuning circuits 2250, a switching device 2260, a filter 2270, a first communication unit 2280, and a second communication unit 2290. In an embodiment, the communication module 2200 may fail to include some of the elements or may further include other element(s). In an embodiment, some of the elements of the communication module 2200 may be combined with each other to be configured as one entity. The communication module 2200 may perform functions of the elements before the combination in the same manner.

According to an embodiment, at least one of the first to third antennas 2210, 2220, and 2230 may include a shared antenna. For example, each of the first and second antennas 2210 and 2220 may be an antenna for short-range communication, and the third antenna 2230 may be an antenna shared for long-range communication and short-range communication. In the present disclosure below, a signal received through the first antenna 2210 may be referred to as a first signal, a signal received through the second antenna 2220 may be referred to as a second signal, and a signal received through the third antenna 2230 may be referred to as a third signal.

According to an embodiment, each of the plurality of tuning circuits 2250 may include a circuit for adjusting a length of the third antenna 2230. For example, the plurality of tuning circuits 2250 may include a first tuning circuit 2251 for adjusting a length of the third antenna 2230 to correspond to a frequency band of short-range communication and a plurality of second tuning circuits 2252 for adjusting a length of the third antenna 2230 to correspond to each of a plurality of frequency bands used for long-range communication. For another example, the plurality of tuning circuits 2250 may include only the plurality of second tuning circuits 2252 for adjusting the length of the third antenna 2230 to correspond to each frequency band without separately including the first tuning circuit 2251. Each of the plurality of second tuning circuits 2252 may be a circuit, impedance of which is matched to each of the plurality frequency bands. The first tuning circuit 2251 may be a circuit, impedance of which is matched to a frequency band of short-range communication.

According to an embodiment, the switching device 2260 may selectively connect the third antenna 2230 with one of the plurality of tuning circuits 2250. The switching device 2260 may be controlled by the processor 2600.

According to an embodiment, the filter 2270 may separate the third signal and a signal of one frequency band from signals received using the third antenna 2230. The filter 2270 may be an extractor or a band pass filter (BPF), which extracts the third signal and the signal of the one frequency band.

According to an embodiment, the first communication unit 2280 may include a communication circuit (e.g., a Bluetooth modem) for short-range communication. The first communication unit 2280 may convert each of signals received through the first to third antennas 2210, 2220, and 2230 into a specified format. The specified format may be a format analyzable by the processor 2600. Further, the first communication unit 2280 may transmit the signal of the specified format in a specified short-range communication mode through the first to third antennas 2210, 2220, and 2230.

According to an embodiment, the second communication unit 2290 may be a communication circuit (e.g., a long term evolution (LTE) modem) for long-range communication. The second communication unit 2290 may convert each of signals received through the third antenna 2230 into a specified format. The specified format may be a format analyzable by the processor 2600. Further, the second communication unit 2290 may transmit the signal of the specified format in a specified long-range communication mode through the third antenna 2230.

According to an embodiment, the processor 2600 may include a first processor 2610 and a second processor 2620. The first processor 2610 may be, for example, a call processor, and the second processor 2620 may be, for example, an application processor. In FIG. 4, an embodiment is exemplified as the processor 2600 is implemented with the first and second processors 2610 and 2620. However, embodiments are not limited thereto. Thus, in the present disclosure hereinafter, an entity of each operation is collectively referred to as the processor 2600 without being classified as the first processor 2610 or the second processor 2620.

According to an embodiment, the third antenna 2230 may be configured to simultaneously receive a signal of one frequency band of long-range communication and a third signal for an AOA function. The one frequency band may be a frequency band which is currently in use or is most recently used among a plurality of frequency bands and may be a band with relatively excellent electric field strength. The memory 2500 may store a plurality of first LUTs respectively corresponding to a plurality of states of the third antenna 2230. Each of the plurality of first LUTs may be determined through an experiment of connecting a tuning circuit corresponding to each frequency band among the plurality of second tuning circuits 2252 to the third antenna 2230 and verifying a phase difference between the first to third signals corresponding to each relative location of the real target device 1000 of FIG. 1.

According to an embodiment, when an AOA function is executed, the processor 2600 may verify that the third antenna 2230 is in a first state where the third antenna 2230 is connected with one tuning circuit corresponding to one frequency band and may obtain an LUT (e.g., first specified reference data) corresponding to a first state of the third antenna 2230 connected to the one tuning circuit among the plurality of LUTs, thus determining a relative location of the target device 1000 using the obtained LUT. While the AOA function is executed, when verifying that the third antenna 2230 is connected to a tuning circuit of another frequency band, the processor 2600 may obtain an LUT (e.g., second specified reference data) corresponding to a second state of the third antenna 2230 connected to the tuning circuit of the other frequency band among a plurality of second LUTs and may determine a relative location of the target device 1000 using the obtained LUT.

According to an embodiment, the third antenna may be configured with selectively receive a third signal for AOA communication and a long-range communication signal. The memory 2500 may store at least one LUT corresponding to a third state of the third antenna 2230 connected with the first tuning circuit 2251 for short-range communication. The at least one LUT may include an LUT determined while varying at least one of a tilt or a cover of the electronic device 2000, in the third state of the third antenna 2230.

In an embodiment, when the AOA function is executed, the processor 2600 may verify whether the third antenna 2230 is connected to the first tuning circuit 2251 for short-range communication. When the third antenna 2230 is not connected to the first tuning circuit 2251, the processor 2600 may control the switching device 2260 to connect the third antenna 2230 to the first tuning circuit 2251. When the third antenna 2230 is connected to the first tuning circuit 2251, the processor 2600 may determine a relative location of the target device 1000 using at least one LUT corresponding to short-range communication, stored in the memory 2500.

The processor 2600 according to an embodiment may increase accuracy of a location determined using the AOA function by determining the relative location of the target device 1000 according to the AOA function using an LUT corresponding to a state of an antenna.

In the above-mentioned embodiments, the LUT corresponding to the state of the third antenna 2230 may include a plurality of LUTs corresponding to a tilt state or a cover state of the electronic device 2000. In this case, the processor 2600 may obtain an LUT (e.g., the first specified reference data or the second specified reference data) according to a tilt state or a cover state of the electronic device 2000 in each state of the third antenna 2230 and may determine a relative location of the target device 1000 using the obtained LUT.

Figure 5:
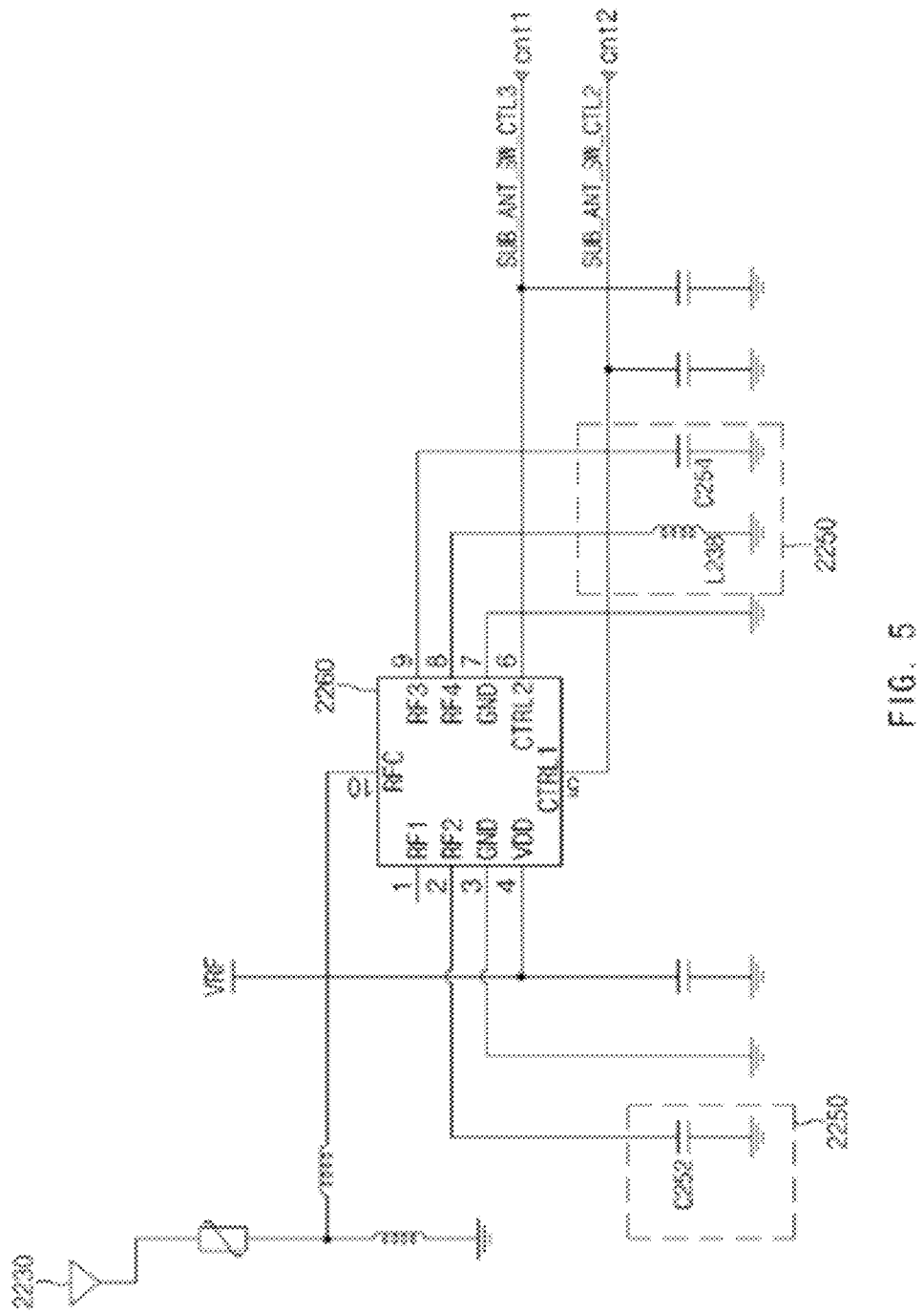
FIG. 5 is a circuit diagram illustrating a detailed configuration of each of a switching element and a tuning circuit according to an embodiment.

FIG. 5 is a circuit diagram illustrating a detailed configuration of each of a switching element (e.g., a switching device 2260 of FIG. 4) and a tuning circuit (e.g., a tuning circuit 2251 of FIG. 4) according to an embodiment. FIG. 5 illustrates an example when a third antenna 2230 is configured to simultaneously receive a short-range communication signal and a long-range communication signal.

Referring to FIG. 5, according to an embodiment, a switching device 2260 may include first to fourth ends RF2, RF3, RF4, and RFC and control signal input ends CTRL1 and CTRL2. The control signal input ends CTRL1 and CTRL2 may be connected with a processor (e.g., a processor 2600 of FIG. 2), the fourth end RFC may be connected with a third antenna 2230, and the first to third ends RF2, RF3, and RF4 may be connected with tuning circuits C252, C254, and L238, respectively. The switching device 2260 may connect the fourth end RFC with one of the first to third ends RF2, RF3, or RF4 depending on a first or second control signal cnt1 or cnt2 respectively received through the control signal input end CTRL2 or CTRL1.

According to an embodiment, a plurality of second tuning circuits 2252 may include the tuning circuit C252 for adjusting a length of the third antenna 2230 to correspond to a first frequency band, a tuning circuit C254 for adjusting a length of the third antenna 2230 to correspond to a second frequency band, and the tuning circuit L238 for adjusting a length of the third antenna 2230 to correspond to a third frequency band. Each of the first to third frequency bands may include a high frequency band, a medium frequency band, and a low frequency band. Additionally or alternatively, each of the tuning circuits C252, C254, and L238 may be a circuit, impedance of which is matched to the third antenna 2230 to correspond to the first to third frequency bands.

Figure 6:
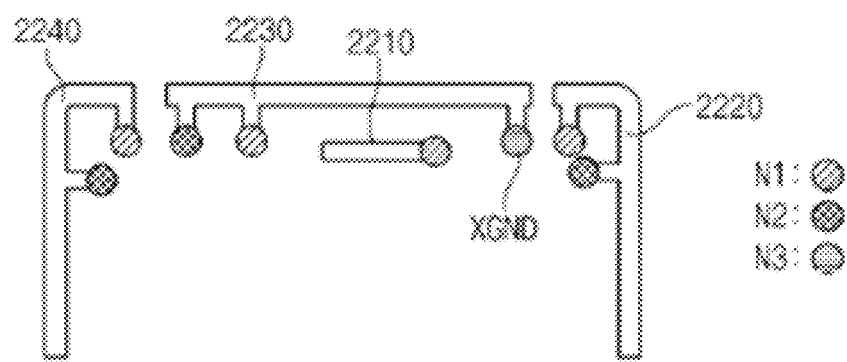
FIG. 6 is a drawing illustrating an antenna arrangement form of an electronic device having a fourth antenna other than first to third antennas according to an embodiment.

FIG. 6 is a drawing illustrating an antenna arrangement form of an electronic device having a fourth antenna other than first to third antennas (e.g., first to third antennas 2210, 2220, and 2230) according to an embodiment.

Referring to FIG. 6, for example, first to fourth antennas 2210, 2220, 2230, and 2240 may be installed in an upper side of an electronic device 2000 of FIG. 2. The first antenna 2210 may be an antenna for short-range communication (e.g., an AOA function) and may be formed in the form of a pattern on a printed circuit board (PCB). The second antenna 2220 may be an antenna for the short-range communication (e.g., the AOA function) and may be disposed at a right edge of a housing of the electronic device 2000. The third antenna 2230 may be an antenna for simultaneously or selectively transmitting and receiving a short-range communication (AOA function) signal and a signal of first and second frequency bands of long-range communication. The third antenna 2230 may be disposed to be long in an upper side of the housing of the electronic device 2000. The fourth antenna 2240 may be an antenna for transmitting and receiving a signal of a third frequency band of long-range communication. The fourth antenna 2240 may be disposed at a right edge of the housing of the electronic device 2000.

According to an embodiment, the first antenna 2210, the second antenna 2220, and the fourth antenna 2240 which are not shared may include a signal transmission and reception node N1 or may include the signal transmission and reception node N1 and a ground node N2. On the other hand, the third antenna 2230 which is shared may further include a node N3 selectively connected to one of a plurality of tuning circuits.

Figure 7:
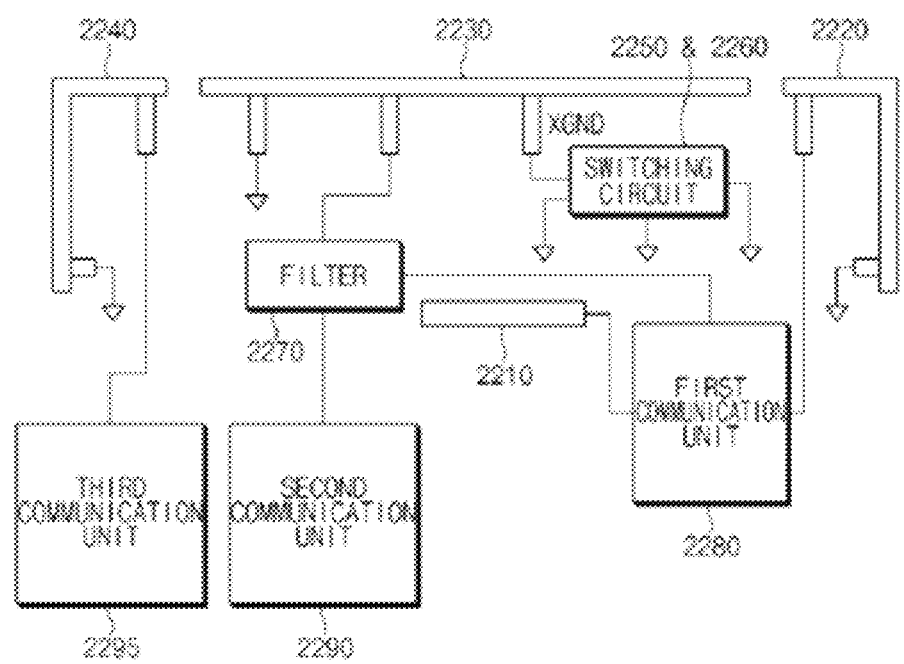
FIG. 7 is a drawing illustrating an arrangement form of circuit elements of first to fourth antennas and a communication module according to an embodiment.

FIG. 7 is a drawing illustrating an arrangement form of circuit elements of first to fourth antennas (e.g., first to third antennas 2210, 2220, and 2230 of FIG. 4 and a fourth antenna 2240 of FIG. 6) and a communication module (e.g., a communication module 2200 of FIG. 2) according to an embodiment.

Referring to FIG. 7, according to an embodiment, the communication circuit 2200 may further include a third communication unit 2295. The third communication unit 2295 may include a communication circuit (e.g., a wireless-fidelity (Wi-Fi) communication circuit) for another specified communication. The third communication unit 2295 may convert each of signals received through a fourth antenna 2240 into a specified format. The specified format may be a format analyzable by a processor 2600 of FIG. 4. Further, the third communication unit 2295 may transmit the signal of the specified format in another communication mode through the fourth antenna 2240.

According to an embodiment, each of the elements of the communication module 2200 may be located close to an antenna which receives a signal among the first to fourth antennas 2210, 2220, 2230, and 2240. For example, a first communication unit 2280 may be located close to the first antenna 2210. Since the second communication unit 2290 receives a signal through a filter 2270, it may be disposed close to the filter 2270. A switching circuit (including a switching device 2260 and a plurality of tuning circuits 2250 of FIG. 4) and the filter 2270 may be disposed close to the third antenna 2230, and the third communication unit 2295 may be disposed close to the fourth antenna 2240. The third communication unit 2295 may convert a signal of a third frequency band of long-range communication, received through the fourth antenna 2240, into a format analyzable by the processor 2600. The third communication unit 2295 may convert a signal from the processor 2600 into a format transmissible by the fourth antenna 2240.

Figure 8:
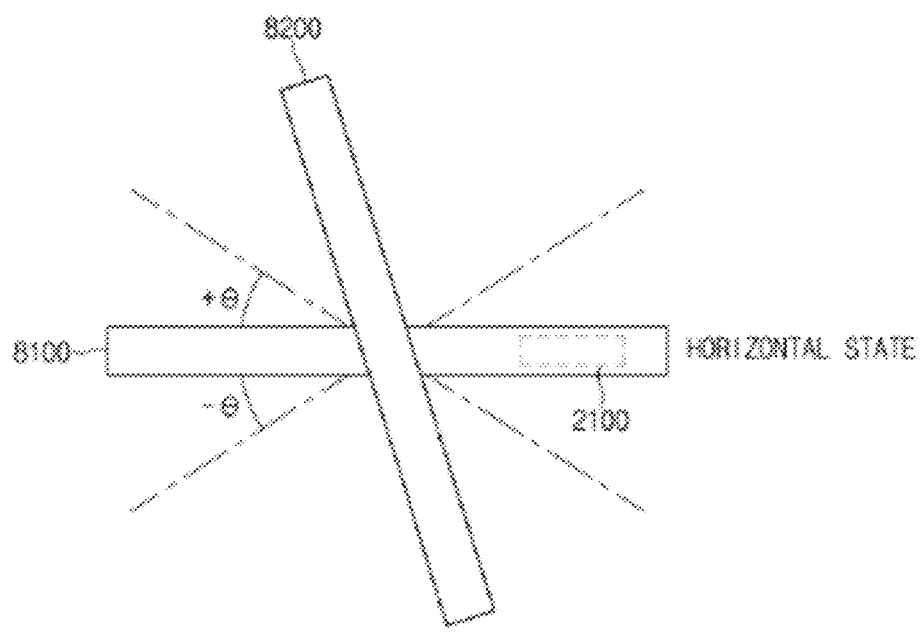
FIG. 8 is a drawing illustrating execution of an AOA function according to a tilt state of an electronic device according to an embodiment.

FIG. 8 is a drawing illustrating execution of an AOA function according to a tilt state of an electronic device according to an embodiment.

According to an embodiment, a processor (e.g., a processor 2600 of FIG. 2) may execute an AOA function based on a tilt state of an electronic device 2000 of FIG. 2. For example, a plurality of LUTs stored in a memory 2500 of FIG. 2 may include a second LUT (e.g., first specified reference data) corresponding to a specified tilt state of the electronic device 2000 and a third LUT corresponding to at least one other tilt state (e.g., second specified reference data). The second LUT may be determined by verifying phase difference information between signals received from a target device 1000 of FIG. 1 while rotating the electronic device 2000 at an angle of 360 degrees at intervals of a specified angle in a horizontal state. The phase difference information may be stored in connection with a relative location (e.g., angle) of the target device 1000 with respect to the electronic device 2000. The horizontal state may be, for example, a state parallel to a horizontal line. The third LUT may include phase difference information between signals received from the target device 1000, verified in a state where the electronic device 2000 is tilted such that a top surface of the electronic device 2000 is located higher than a bottom surface of the electronic device 2000. Alternatively, the third LUT may include phase difference information between signals received from the target device 1000 while rotating the electronic device 2000 at an angle of 360 degrees at intervals of a specified angle in a state where the electronic device 2000 is tilted such that the bottom surface of the electronic device 2000 is located higher than the top surface of the electronic device 2000. In this case, an angle where the electronic device 2000 is tilted relative to the horizontal line may be greater than, for example, +25 degrees or −25 degrees.

Referring to FIG. 8, according to an embodiment, when executing the AOA function, the processor 2600 may detect a tilt of the electronic device 2000 using a sensor 2100 of FIG. 2 and may verify whether the detected tilt is within a specified threshold angle (e.g., an angle of −θ to +θ). When the detected tilt is within the specified threshold angle (e.g., when the electronic device 2000 is tilted by −θ or +θ from state 8100), the processor 2600 may determine a relative location of the target device 1000 using the second LUT. On the other hand, when the tilt of the electronic device 200 departs from the specified threshold angle (e.g., when the electronic device 2000 is in state 8200), the processor 2600 may obtain an LUT corresponding to a current tilt of the electronic device 2000 from the memory 2500 and may determine a relative location of the target device 1000 using the obtained LUT.

Figure 9:
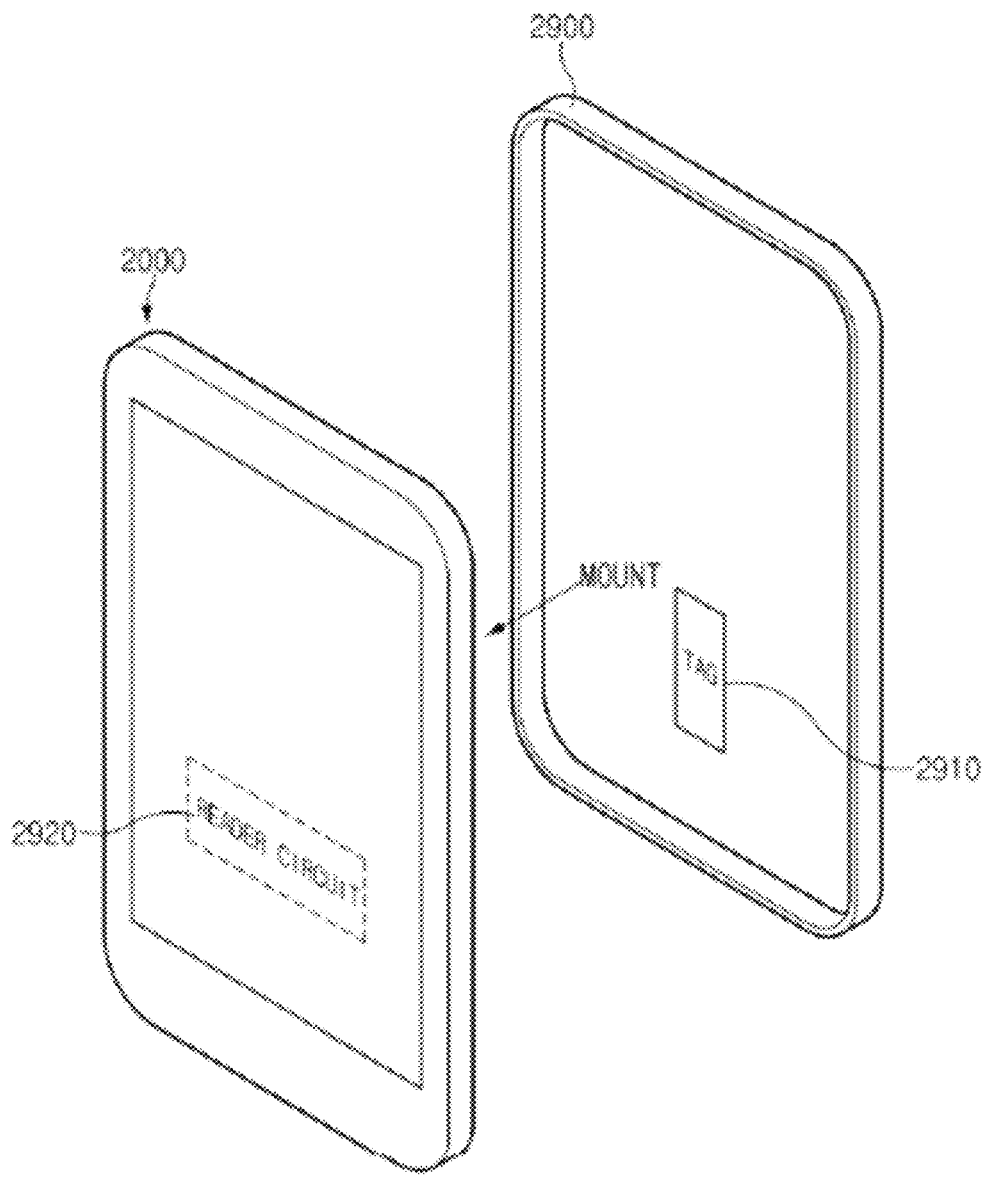
FIG. 9 is a drawing illustrating execution of an AOA function according to a cover state of an electronic device according to an embodiment.

FIG. 9 is a drawing illustrating execution of an AOA function according to a cover state of an electronic device according to an embodiment.

Referring to FIG. 9, according to an embodiment, a cover 2900 may be combined with at least a portion of an electronic device 2000. A tag 2910 including a cover identifier may be installed in the cover 2900. A communication module 2200 of FIG. 2 may include a reader circuit 2920 capable of reading information stored in the tag 2910.

According to an embodiment, a memory 2500 of FIG. 2 may include at least one third LUT respectively corresponding to at least one cover. The at least one third LUT may be determined using, for example, a phase difference between third to third signals in a state where the electronic device 2000 is combined with the at least one cover. The at least one third LUT (e.g., at least one of first specified reference data or second specified reference data) may be differently configured according to at least one of a thickness, materials, or transparency of the at least one cover. The at least one third LUT may be experimentally or statistically calculated for each cover and may be stored and updated in the memory 2500 at a time when the electronic device 2000 is manufactured or through wired and wireless communication.

According to an embodiment, when an AOA function is executed, a processor 2600 of FIG. 2 may verify a cover identifier obtained from the tag 2910 using the reader circuit 2920 and may obtain an LUT corresponding to the verified cover identifier among the at least one third LUT, thus determining a relative location of a target device. The processor 2600 according to an embodiment may prevent an error from being generated in a location determined by the AOA function due to a state about the cover 2900 of the electronic device 2000.

According to an embodiment, the processor 2600 may obtain context information (or an event) associated with a state of the electronic device 2000. When the context information meets a first specified condition, the processor 2600 may determine phase difference information corresponding to signals obtained using a plurality of antennas (e.g., the first to third antennas 2210, 2220, 2230 of FIG. 4) based on first specified reference data (or an LUT). When the context information meets second specified condition, the processor 2600 may determine phase difference information corresponding to signals obtained using the plurality of antennas based on second specified reference data. The processor 2600 may determine a relative location between the electronic device 2000 and an external electronic device based on the determined phase difference information.

According to an embodiment, when verifying at least one of when at least one of the plurality of antennas is in a specified state, when a tilt of the electronic device 2000 is a specified tilt, or when a cover which covers at least a portion of the electronic device 2000 is a specified cover from the context information, the processor 2600 may determine that the context information meets the first specified condition. The specified state may include, for example, states of the plurality of antennas capable of receiving the signals for determining the phase difference information. In this case, the first specified reference data may be determined when the plurality of antennas are in the specified state. The specified antenna may include, for example, a tilt corresponding to the first specified reference data. In this case, the first specified reference data may be determined when a tilt of the electronic device 2000 is a specified tilt. The specified cover may include a cover corresponding to the first specified reference data. In this case, the first specified reference data may be determined when the specified cover is mounted.

According to an embodiment, when the context information does not the first specified condition, the processor 2600 may determine that the context information meets a second specified condition.

According to an embodiment, an electronic device (e.g., the electronic device 2000 of FIG. 2) includes a plurality of antennas (e.g., the first to third antennas 2210, 2220, 2230 of FIG. 4); a memory (e.g., the memory 2500 of FIG. 2) storing at least one reference data; and a processor (e.g., the processor 2600 of FIG. 2). Wherein the processor is configured to obtain context information associated with a state of the electronic device; when the context information meets a first specified condition, determine phase difference information corresponding to signals obtained using the plurality of antennas based on first specified reference data; when the context information meets a second specified condition, determine phase difference information corresponding to signals obtained using the plurality of antennas based on second specified reference data; and determine a relative location of an external electronic device with respect to the electronic device based on the determined phase difference information.

The processor is configured to when verifying at least one of when at least one of the plurality of antennas is in a specified state, when a tilt of the electronic device is a specified tilt, or when a cover which covers at least a portion of the electronic device is a specified cover, determine the context information meets the first specified condition.

The specified condition comprises a state where the plurality of antennas are able to receive the signals for determining the phase difference information corresponding to the first specified reference data.

The specified tilt comprises a tilt corresponding to the first specified reference data.

The specified cover comprises a cover (e.g., the cover 2900 of FIG. 9) corresponding to the first specified reference data.

The processor is configured to when the context information does not meet the first specified condition, determine that the context information meets the second specified condition.

According to an embodiment, an electronic device (e.g., the electronic device 2000 of FIG. 2) includes first to third antennas (e.g., the first to third antennas 2210, 2220, 2230 of FIG. 4); a memory (e.g., the memory 2500 of FIG. 2) storing a plurality of look-up tables (LUTs); and a processor (e.g., the processor 2600 of FIG. 2) configured to be electrically connected with the first to third antennas and the memory, wherein the processor is configured to when an angle of arrival (AOA) function is executed, verify an event associated with a state of the electronic device; obtain an LUT corresponding to the state of the electronic device among the plurality of LUTs stored in the memory; obtain a phase difference between first to third signals which are transmitted from another electronic device and are received using the first to third antennas; determine a relative location of the other electronic device with respect to the electronic device corresponding to the phase between the first to third signals, based on phase difference information included in the obtained LUT; and store the determined relative location in the memory.

According to an embodiment, the electronic device further includes a display (e.g., the display 2400 of FIG. 2), wherein the processor is configured to output the determined relative location on the display.

The state of the electronic device comprises at least one of a state where at least one of the first to third antennas is connected, a tile of the electronic device, or a state of a cover combined with the electronic device.

At least one of the third to third antennas comprises a shared antenna, wherein the shared antenna is configured to simultaneously receive a signal associated with the AOA function and another signal, and wherein the another signal comprises a signal transmitted in one frequency band used for another communication among a plurality of frequency bands for the other communication, further includes a plurality of tuning circuits (e.g., a plurality of tuning circuits 2250 of FIG. 4) configured to change a state of at least one of a length or impedance of the shared antenna to respectively correspond to the plurality of frequency bands; and a switching device (e.g., switching device 2260 of FIG. 4) configured to selectively connect the shared antenna to one tuning circuit corresponding to the one frequency band among the plurality of tuning circuits, wherein the plurality of LUTs comprise a plurality of first LUTs respectively corresponding to a plurality of states of the shared antenna connected to each of the plurality of tuning circuits, and wherein the processor is configured to when the AOA function is executed, verify that the shared antenna is connected with the one tuning circuit; and obtain an LUT corresponding to a state of the shared antenna connected with the one tuning circuit among the plurality of first LUTs.

The processor is configured to while the AOA function is executed, when verifying that the shared antenna is connected to another tuning circuit for changing a state of the shared antenna to correspond to another of the plurality of frequency bands, obtain an LUT corresponding to the state of the shared antenna connected to the another tuning circuit among the plurality of first LUTs.

At least one of the first to third antennas comprises a shared antenna, further includes a first tuning circuit (e.g., the first tuning circuit 2251 of FIG. 4) for the AOA function; at least one second tuning circuit (e.g., the second tuning circuit 2252 of FIG. 4) for another communication which uses a plurality of frequency bands; and a switching device (e.g., the switching device 2260 of FIG. 4) configured to selectively connect the shared antenna to one of the first tuning circuit and the at least one second tuning circuit.

Wherein the processor is configured to when the AOA function is executed, verify whether the shared antenna is connected to the first tuning circuit; and when the shared antenna is not connected to the first tuning circuit, control the switching device such that the shared antenna is connected to the first tuning circuit.

The plurality of LUTs comprise a plurality of LUTs corresponding to at least one of a plurality of tilts of the electronic device or a plurality of covers connected to the electronic device while corresponding to a state where the shared antenna is connected to the first tuning circuit, and wherein the processor is configured to when the shared antenna is connected to the first tuning circuit, verify at least one of a tilt of the electronic device or a cover combined with the electronic device; and obtain an LUT corresponding to the at least verified one among the plurality of LUTs.

The electronic device further includes a sensor (e.g., the sensor 2100 of FIG. 2) configured to sense a tilt of the electronic device, wherein the plurality of LUTs comprise a plurality of second LUTs respectively corresponding to a plurality of tilts of the electronic device, and wherein the processor is configured to when the AOA function is executed, verify a tilt of the electronic device using the sensor; and obtain an LUT corresponding to the verified tilt among the plurality of second LUTs.

The electronic device further includes at least one cover (e.g., the cover 2900 of FIG. 9) configured to cover at least a portion of the electronic device, the at least one cover having a tag including a cover identifier; and a reader configured to read the cover identifier stored in the tag, wherein the plurality of LUTs comprise at least one third LUT respectively corresponding to the at least one cover, the at least one third LUT being determined using a phase difference between the first to third signals verified in a state where the electronic device is combined with the at least one cover, and wherein the processor is configured to when the AOA function is executed, verify the cover identifier obtained from the tag using the reader; and obtain an LUT corresponding to the verified cover identifier among the at least one third LUT.

Figure 10:
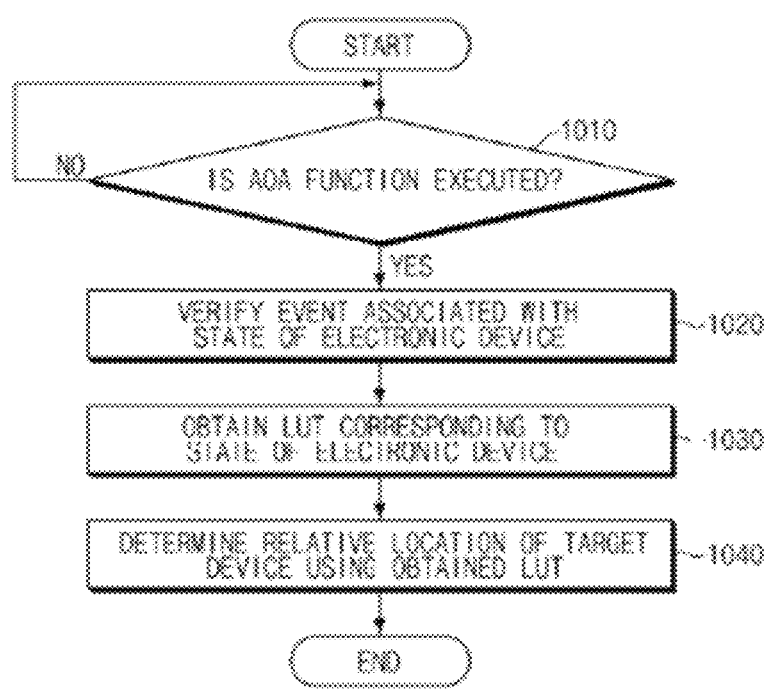
FIG. 10 is a flowchart illustrating a method for executing an AOA function according to an embodiment.

FIG. 10 is a flowchart illustrating a method for executing an AOA function according to an embodiment.

Referring to FIG. 10, in operation 1010, a processor (e.g., a processor 2600 of FIG. 2) may determine whether an AOA function is executed. For example, the AOA function may be executed when a user input for requesting to execute the AOA function is received from an input module 2300 of FIG. 2 or according to a request of an executed application.

When the AOA function is executed, in operation 1020, the processor 2600 may verify context information (e.g., an event) associated with a state of the electronic device 2000. The context information (e.g., the event) (hereinafter referred to as "event") may include at least one of, for example, an antenna state of the electronic device 2000, a tilt state of the electronic device 2000, or a cover state of the electronic device 2000.

In operation 1030, the processor 2600 may obtain an LUT corresponding to a state of the electronic device 2000 among a plurality of LUTs stored in a memory 2500. The plurality of LUTs may include at least one of at least one first LUT corresponding to different antenna states of the electronic device 2000, a plurality of second LUTs corresponding to different tilt states of the electronic device 2000, or a plurality of third LUTs corresponding to different cover states of the electronic device 2000.

In operation 1040, the processor 2600 may determine a relative location of a target device (e.g., a target device 1000 of FIG. 1) using the obtained LUT. For example, the processor 2600 may sequentially receive first to third signals, transmitted from another electronic device, using first to third antennas 2210, 2220, and 2230 and may verify a phase of each of the received first to third signals. The processor 2600 may verify a phase difference between the first to third signals and may verify phase difference information included in the obtained LUT, which is identical to the phase difference between the first to third signals, thus determining a relative location of the target device 1000 with respect to the electronic device 2000, corresponding to the verified phase difference information.

After operation 1040, the processor 2600 may perform at least one of an operation of storing the determined relative location of the target device 1000 in the memory 2500 or an operation of outputting the determined relative location of the target device 1000 on the display 2400.

Figure 11:
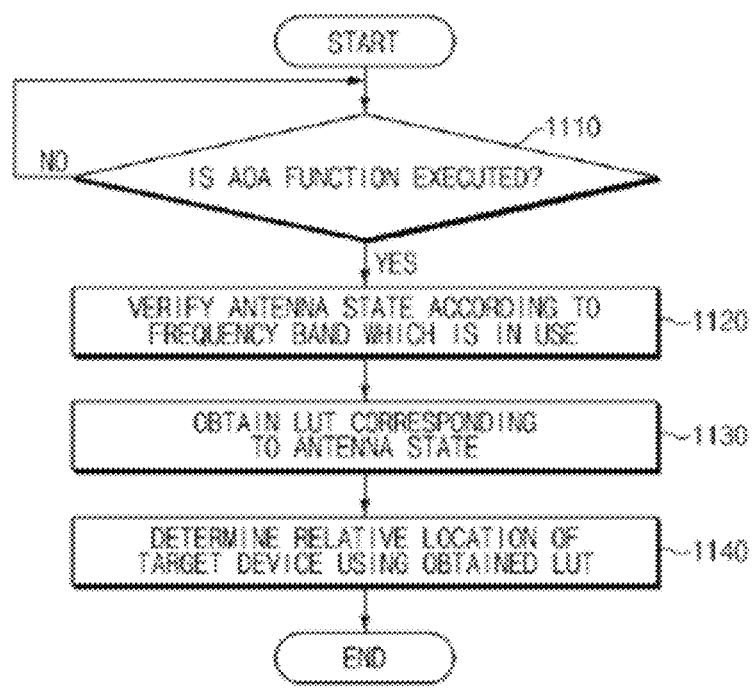
FIG. 11 is a flowchart illustrating a method for executing an AOA function according to an antenna state according to an embodiment.

FIG. 11 is a flowchart illustrating a method for executing an AOA function according to an antenna state according to an embodiment.

Referring to FIG. 11, when an AOA function is executed in operation 1110, in operation 1120, a processor (e.g., a processor 2600 of FIG. 2) may verify a current state (e.g., at least one of an antenna length or impedance) of a shared antenna (e.g., a third antenna 2230) according to a frequency band which is in use for long-range communication.

In operation 1130, the processor 2600 may obtain an LUT corresponding to the current state of the shared antenna among a plurality of first LUTs corresponding to a plurality of states of the shared antenna, stored in a memory 2500 of FIG. 2. Each of the plurality of states of the shared antenna may be, for example, a state where at least one of an antenna length or impedance is changed to correspond to each frequency band. Each of the plurality of first LUTs may include phase difference information corresponding to each relative location of a target device (e.g., a target device 1000 of FIG. 1), verified in each of the plurality of states of the shared antenna.

In operation 1140, the processor 2600 may determine a relative location of the target device 1000 using the obtained LUT. For example, the processor 2600 may sequentially receive first to third signals, transmitted from another electronic device, using first to third antennas 2210, 2220, and 2230 and may verify a phase of each of the received first to third signals. The processor 2600 may verify a phase difference between the first to third signals and may verify phase difference information included in the obtained LUT, which is identical to the phase difference between the first to third signals, thus determining a relative location of the target device 1000 with respect to the electronic device 2000, corresponding to the verified phase difference information. Thus, the processor 2600 may prevent an error due to a change in antenna state from being generated in a location determined by the AOA function.

After operation 1140, the processor 2600 may perform at least one of an operation of storing the determined relative location of the target device 1000 in a memory 2500 of FIG. 2 or an operation of outputting the determined relative location of the target device 1000 on a display 2400 of FIG. 2.

Figure 12:
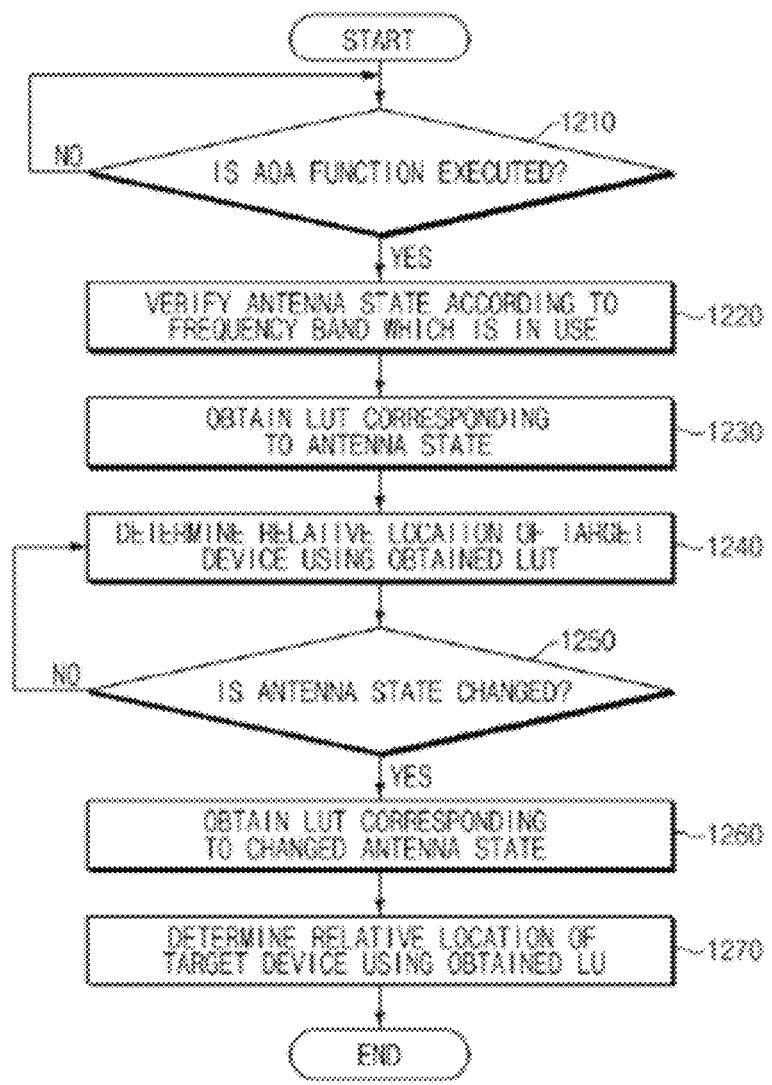
FIG. 12 is a flowchart illustrating a method for executing an AOA function according to an antenna state according to another embodiment.

FIG. 12 is a flowchart illustrating a method for executing an AOA function according to an antenna state according to another embodiment.

Referring to FIG. 12, when an AOA function is executed in operation 1210, in operation 1220, a processor (e.g., a processor 2600 of FIG. 2) may verify a current state (e.g., at least one of an antenna length or impedance) of a shared antenna (e.g., a third antenna 2230) according to a frequency band which is in use for long-range communication.

In operation 1230, the processor 2600 may obtain an LUT corresponding to the current state of the shared antenna among a plurality of first LUTs corresponding to a plurality of states of the shared antenna, stored in a memory 2500 of FIG. 2. Each of the plurality of states of the shared antenna may be, for example, a state where at least one of an antenna length or impedance is changed to correspond to each frequency band. Each of the plurality of first LUTs may include phase difference information corresponding to each relative location of a target device (e.g., a target device 1000 of FIG. 1), verified in each of the plurality of states of the shared antenna.

In operation 1240, the processor 2600 may determine a relative location of the target device 1000 using the obtained LUT. For example, the processor 2600 may sequentially receive first to third signals, transmitted from another electronic device, using first to third antennas 2210, 2220, and 2230 and may verify a phase of each of the received first to third signals. The processor 2600 may verify a phase difference between the first to third signals and may verify phase difference information included in the obtained LUT, which is identical to the phase difference between the first to third signals, thus determining a relative location of the target device 1000 with respect to an electronic device (e.g., an electronic device 2000 of FIG. 1), corresponding to the verified phase difference information.

In operation 1250, the processor 2600 may monitor a change in a state of the shared antenna while the AOA function is executed. The change in the state of the shared antenna may be generated as a frequency band which is in use for long-range communication is changed.

In operation 1260, when verifying that the state of the shared antenna is changed, the processor 2600 may obtain an LUT corresponding to another frequency band among the plurality of first LUTs stored in the memory 2500. In operation 1270, the processor 2600 may determine a relative location of the target device 1000 with respect to the electronic device 2000 using the obtained LUT. Thus, the processor 2600 may prevent an error due to a change in antenna state from being generated in a location determined by the AOA function.

In at least one of operations 1240 and 1270, the processor 2600 may perform at least one of an operation of storing the determined relative location of the target device 1000 in the memory 2500 or an operation of outputting the determined relative location of the target device 1000 on a display 2400 of FIG. 2.

Figure 13:
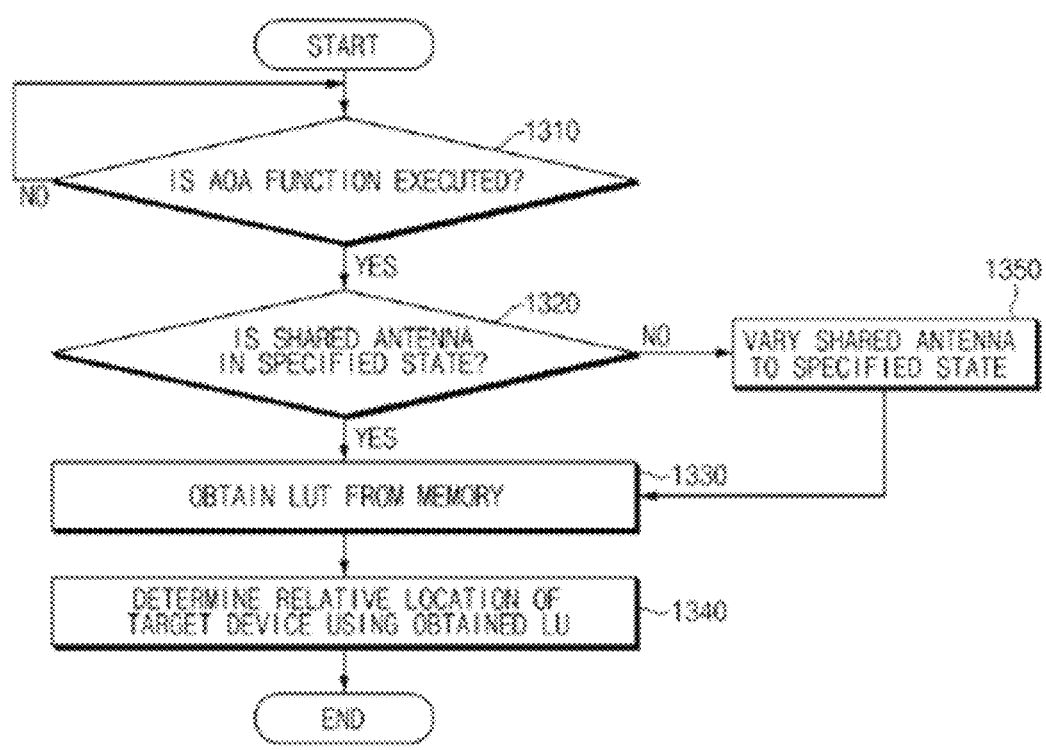
FIG. 13 is a flowchart illustrating a method for executing an AOA function under control of an antenna path according to an embodiment.

FIG. 13 is a flowchart illustrating a method for executing an AOA function under control of an antenna path according to an embodiment. In FIG. 13, an embodiment is exemplified as a shared antenna (e.g., a third antenna 2230) is configured to receive a signal of one of a plurality of frequency bands or a signal for short-range communication at one time.

Referring to FIG. 13, when an AOA function is executed in operation 1310, in operation 1320, a processor (e.g., a processor 2600 of FIG. 2) may determine whether the shared antenna (e.g., the third antenna 2230) is in a specified state. The specified state may be, for example, a state where a tuning circuit corresponding to short-range communication used for the AOA function is connected to the shared antenna (e.g., the third antenna 2230).

When the shared antenna (e.g., the third antenna 2230) is in the specified state, in operation 1330, the processor 2600 may obtain an LUT corresponding to the specified state from a memory 2500 of FIG. 2. When the memory 2500 includes a plurality of LUTs respectively corresponding to a plurality of states (e.g., at least one of a tilt state or a cover state) of the electronic device 2000 in the specified state of the shared antenna (e.g., the third antenna 2230), the processor 2600 may verify at least one of a tilt state or a cover state of an electronic device (e.g., an electronic device 2000 of FIG. 1) and may obtain an LUT corresponding to the verified state of the electronic device 2000.

In operation 1340, the processor 2600 may determine a relative location of a target device (e.g., a target device 1000 of FIG. 1) with respect to the electronic device 2000 using the obtained LUT. Thus, the processor 2600 may prevent an error due to a change in antenna state from being generated in a location determined by the AOA function.

On the other hand, when verifying that the shared antenna (e.g., the third antenna 2230) is not in the specified state in operation 1320, in operation 1350, the processor 2600 may change the shared antenna (e.g., the third antenna 2230) to the specified state. For example, the processor 2600 may connect the shared antenna (e.g., the third antenna 2230) to a tuning circuit corresponding to short-range communication.

After operation 1340, the processor 2600 may perform at least one of an operation of storing the determined relative location of the target device 1000 in the memory 2500 or an operation of outputting the determined relative location of the target device 1000 on a display 2400 of FIG. 2.

Figure 14:
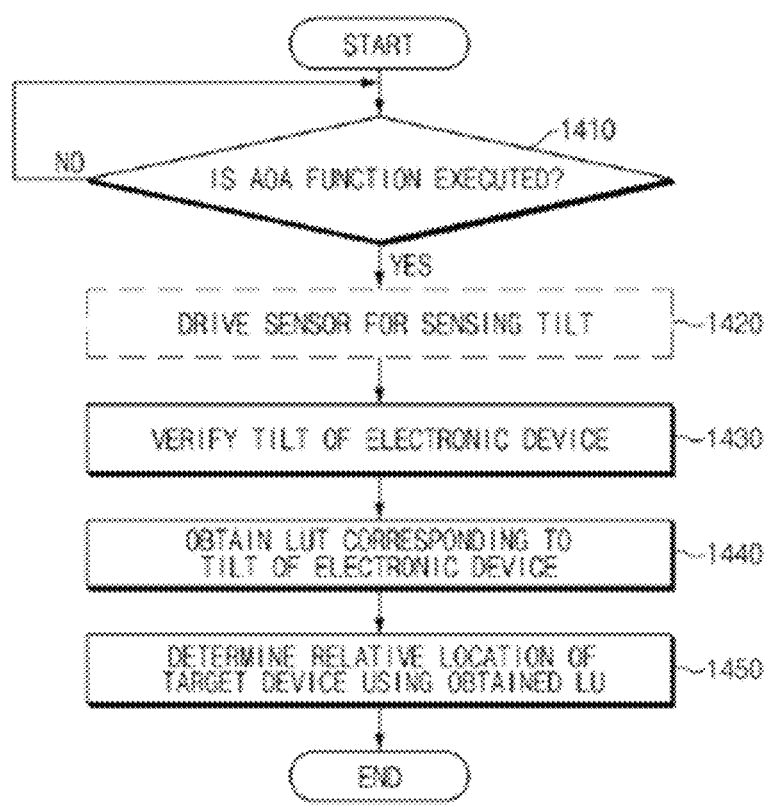
FIG. 14 is a flowchart illustrating a method for executing an AOA function according to a tilt state of an electronic device according to an embodiment.

FIG. 14 is a flowchart illustrating a method for executing an AOA function according to a tilt state of an electronic device according to an embodiment.

Referring to FIG. 14, when an AOA function is executed in operation 1410, in operation 1420, a processor (e.g., a processor 2600 of FIG. 2) may drive a sensor 2100 for sensing a tilt. When the sensor 2100 for sensing the tilt is driven before the AOA is executed, operation 1420 may be omitted.

In operation 1430, the processor 2600 may verify a tilt of an electronic device (e.g., an electronic device 2000 of FIG. 1) using the sensor 2100 for detecting the tilt.

In operation 1440, the processor 2600 may obtain an LUT corresponding to a current tilt of the electronic device 2000 among a plurality of LUTs respectively corresponding to a plurality of tilts of the electronic device 2000, stored in a memory 2500 of FIG. 2. Each of the plurality of LUTs may include phase difference information corresponding to each relative location of a target device (e.g., a target device 1000 of FIG. 1), verified in each of the plurality of tilt states of the electronic device 2000. Thus, the processor 2600 according to one embodiment may prevent an error due to a change in a tilt state of the electronic device 2000 from being generated in a location determined by the AOA function.

In operation 1450, the processor 2600 may determine a relative location of the target device 1000 with respect to the electronic device 2000 using the obtained LUT. For example, the processor 2600 may sequentially receive first to third signals, transmitted from another electronic device, using first to third antennas 2210, 2220, and 2230 and may verify a phase difference between the first to third signals. The processor 2600 may verify phase difference information included in the obtained LUT, which is identical to the phase difference between the first to third signals and may determine a relative location of the target device 1000 with respect to the electronic device 2000, corresponding to the verified phase difference information.

After operation 1450, the processor 2600 may perform at least one of an operation of storing the determined relative location of the target device 1000 in a memory 2500 of FIG. 2 or an operation of outputting the determined relative location of the target device 1000 on a display 2400 of FIG. 2.

Figure 15:
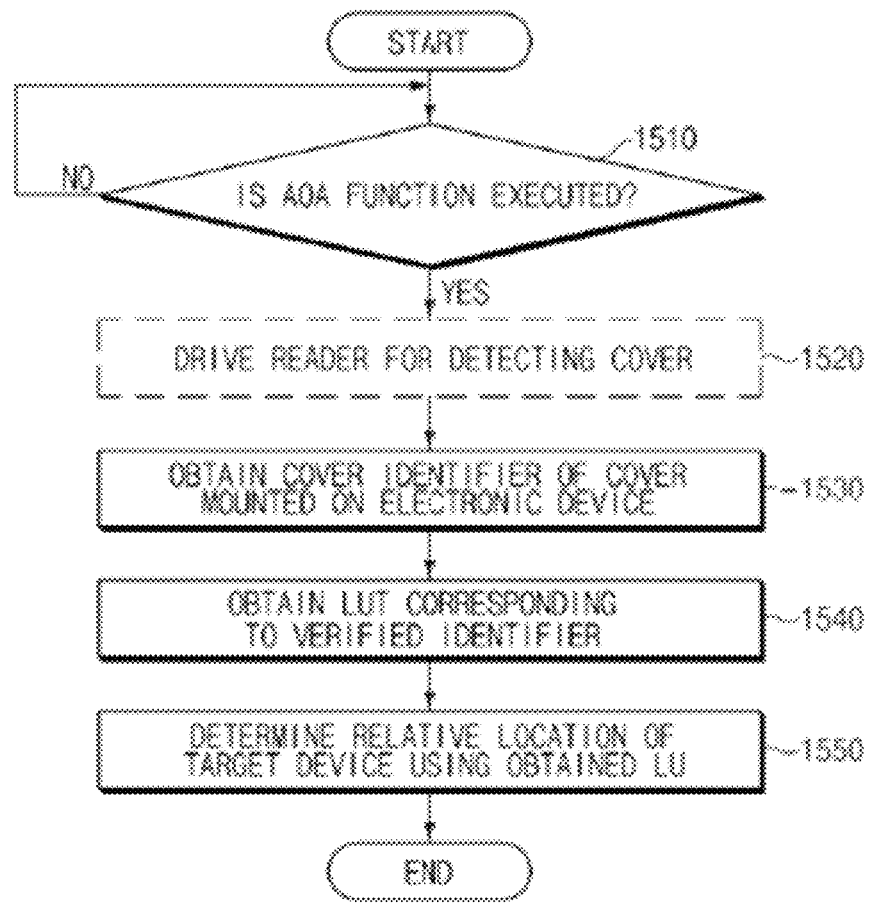
FIG. 15 is a flowchart illustrating a method for executing an AOA function according to a cover state of an electronic device according to an embodiment.

FIG. 15 is a flowchart illustrating a method for executing an AOA function according to a cover state of an electronic device according to an embodiment.

Referring to FIG. 15, when an AOA function is executed in operation 1510, in operation 1520, a processor (e.g., a processor 2600 of FIG. 2) may activate a reader for detecting a cover (e.g., a reader circuit 2920 of FIG. 9). When the reader circuit 2920 is activated before the AOA is executed, operation 1520 may be omitted.

In operation 1530, the processor 2600 may obtain a cover identifier from a tag 2910 of a cover 2900 of an electronic device 2000 of FIG. 9 using the reader circuit 2920.

In operation 1540, the processor 2600 may obtain an LUT corresponding to the obtained cover identifier among a plurality of LUTs respectively corresponding to a plurality of cover identifiers stored in a memory 2500 of FIG. 2. Each of the plurality of LUTs may be determined through, for example, an experiment of verifying phase difference information corresponding to a relative location of a target device (e.g., a target device 1000 of FIG. 1) using the AOA function in a state where a cover corresponding to each cover identifier is mounted on the electronic device 2000.

In operation 1550, the processor 2600 may determine a relative location of the target device 1000 using the obtained LUT. Thus, the processor 2600 may prevent an error due to a change in antenna state from being generated in a location determined by the AOA function.

After operation 1550, the processor 2600 may perform at least one of an operation of storing the determined relative location of the target device 1000 in the memory 2500 or an operation of outputting the determined relative location of the target device 1000 on a display 2400 of FIG. 2.

Hereinafter, a description will be given of a comparison between an error of a relative location determined when a conventional LUT is used and an error of a relative location determined when an LUT corresponding to a state of an electronic device is used, with reference to Graphs 1 to 4 provided in FIGS. 18-21.

Figure 18:
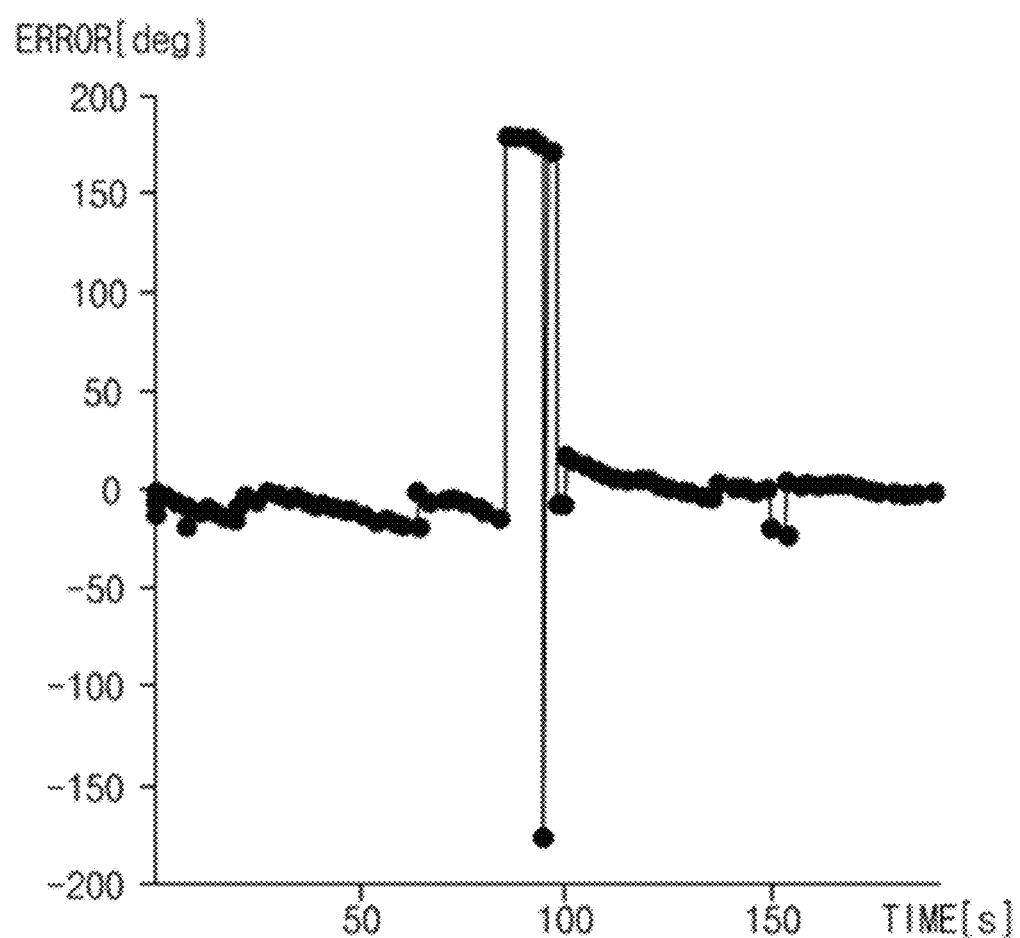
FIG. 18 depicts a graph illustrating a relative location determined according to certain embodiments of this disclosure.

FIG. 18 depicts a graph, (hereinafter "Graph 1"), which may be a graph illustrating a relative location determined using a conventional LUT while rotating an electronic device according to an embodiment. In Graphs 1 and 2, a horizontal axis may indicate an angle (e.g., 1 value of a spherical coordinate system) corresponding to a heading angle of the electronic device, and 0 point of the horizontal axis may be a state where the electronic device is not rotated. A vertical axis may indicate an error axis of a relative location determined by an AOA function, and 0 point of the vertical axis may be a state where there is no error in the determined location. A shared antenna (e.g., a third antenna 2230) may be configured to simultaneously receive a signal for the AOA function and a signal for long-range communication.

In Graph 1, the shared antenna 2230 may have a first state in an interval of 0 degree to 80 degrees and in an interval of 100 degrees to 225 degrees and may have a second state in an interval of 80 degrees to 100 degrees. The first state may be a state where the shared antenna 2230 is varied to a length corresponding to a first frequency band, and the second state may be a state where the shared antenna 2230 is varied to a length corresponding to a second frequency band. In Graph 1, the processor 2600 performs the AOA function using an LUT corresponding to when the shared antenna 2230 is in the first state.

Like an interval except for the interval of 80 degrees to 100 degrees, when the AOA function is performed using an LUT corresponding to a current antenna state, an error determined by the AOA function may fail to be large. However, like the interval of 80 degrees to 100 degrees in Graph 1, when the AOA function is performed using an LUT which does not correspond to a current antenna state, it may be verified that an error in a relative location determined by the AOA function becomes very large.

Figure 19:
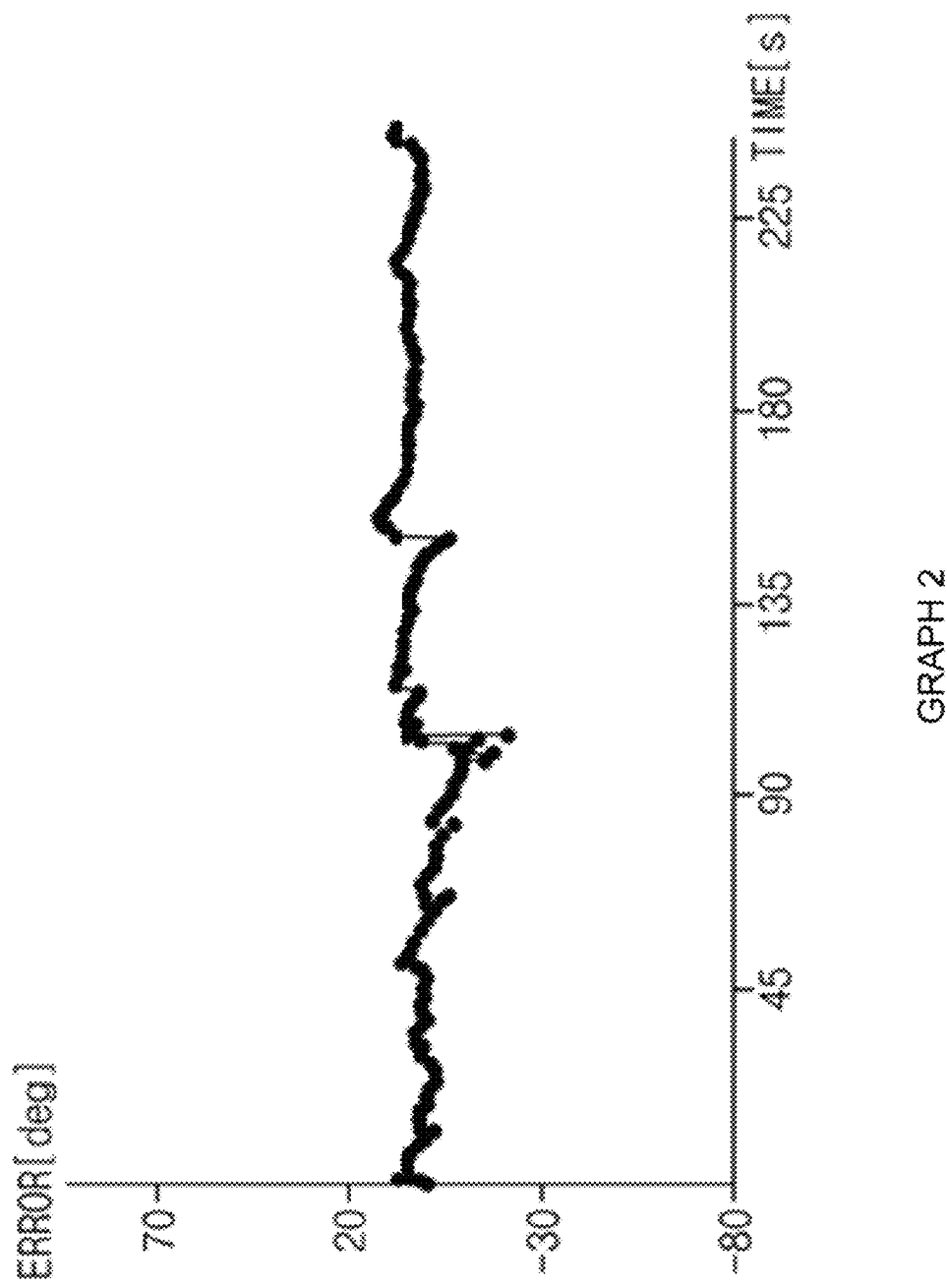
FIG. 19 depicts a graph illustrating an error in a relative location determined according to various embodiments of this disclosure.

FIG. 19 depicts a graph (hereinafter, "Graph 2"), which is a graph illustrating an error in a relative location determined using an LUT according to an antenna state while rotating an electronic device according to an embodiment.

In Graph 2, the processor 2600 may monitor a state of the shared antenna 2230 and may perform the AOA function using an LUT corresponding to the state of the shared antenna 2230. For example, the processor 2600 may perform the AOA function using an LUT corresponding to the first state of the shared antenna 2230 in an interval of 0 degree to 80 degrees and an interval of 100 degrees to 225 degrees and may perform the AOA function using an LUT corresponding to the second state of the shared antenna 2230 in an interval of 80 degrees to 100 degrees.

In Graph 2, it may be verified that an error may be more reduced when an LUT according to an antenna state is used for the AOA than when the LUT according to the antenna state is not used (e.g., Graph 1).

Figure 20:
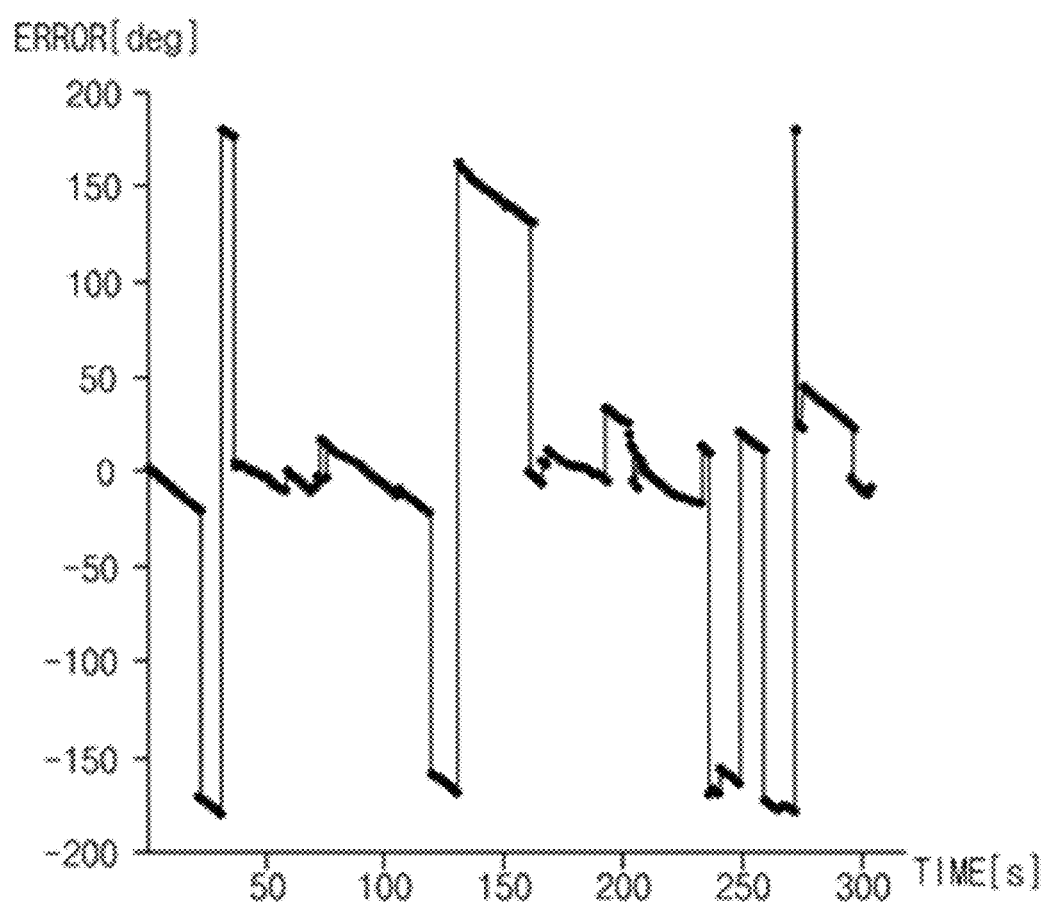
FIG. 20 depicts a graph illustrating an error in a relative location determined according to some embodiments of this disclosure.

FIG. 20 depicts a graph (hereinafter, "Graph 3"), which is a graph illustrating an error in a relative location determined using a conventional LUT while rotating an electronic device according to an embodiment. In Graphs 3 and 4, a horizontal axis may be an angle axis [s] and may indicate an angle of the electronic device, and 0 point of the horizontal axis may be a state where the electronic device is not rotated. A vertical axis may indicate an error in a relative location determined by the AOA function, and 0 point of the vertical axis may be a state where there is no error in the determined location.

In Graph 3, the processor 2600 may determine a relative location of a target device using an LUT (a conventional LUT) determined when the electronic device 2000 is in a horizontal state. In this case, when a tilt state of the electronic device 2000 is changed (e.g., an interval of 20 degrees to 30 degrees), for example, when a front surface of the electronic device 2000 forms an angle of 30 degrees or more with a horizontal line, it may be seen that an error in the determined relative location becomes large.

Figure 21:
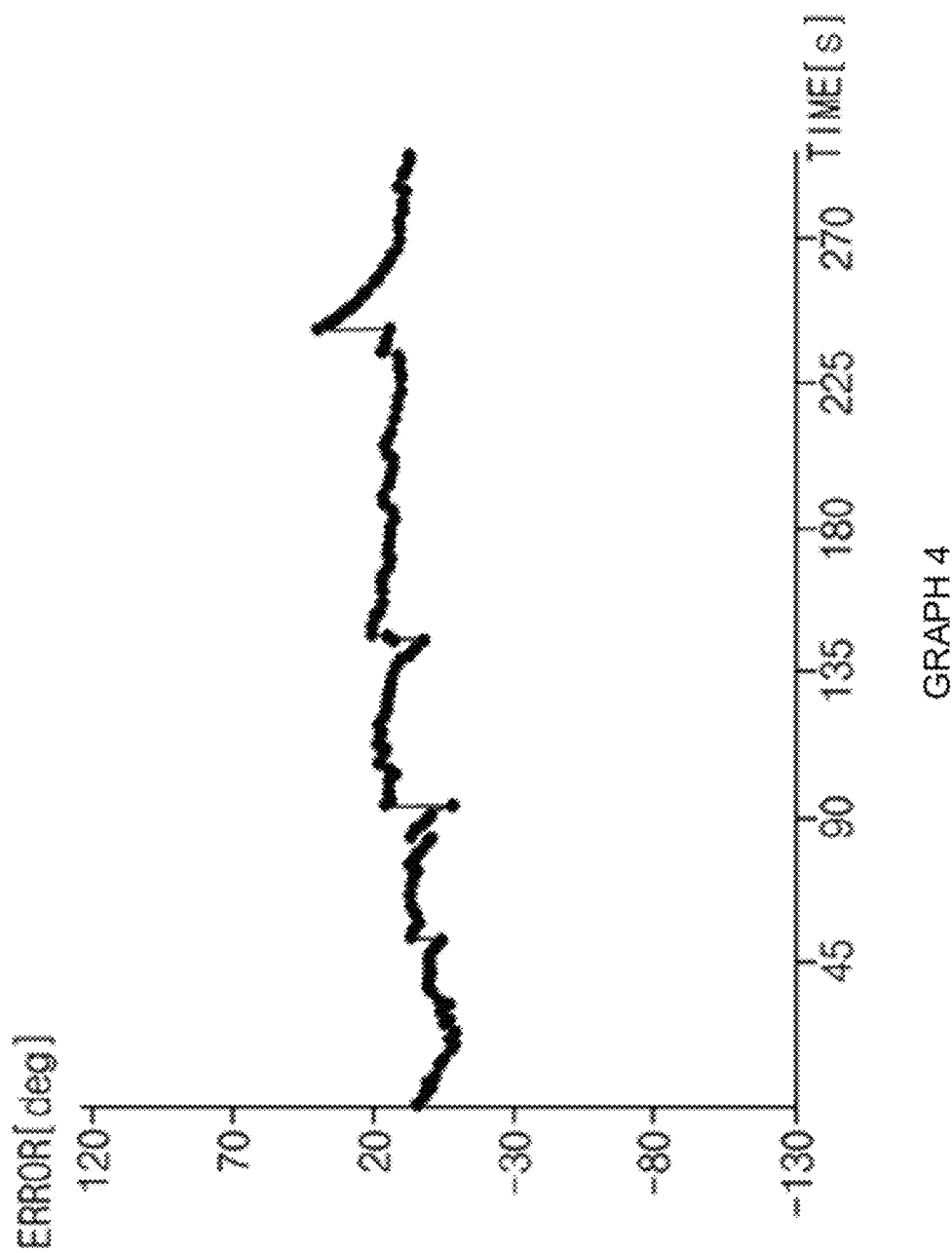
FIG. 21 depicts a graph illustrating an error in a relative location determined according to some embodiments of this disclosure.

FIG. 21 depicts a graph (hereinafter, "Graph 4") which is a graph illustrating an error in a relative location determined using an LUT corresponding to a tilt of the electronic device while rotating the electronic device according to an embodiment.

In Graph 4, the processor 2600 may verify a tilt state of the electronic device 2000 when performing the AOA function and may determine a relative location of a target device using an LUT corresponding to the tilt state from the memory 2500. In this case, it may be seen that, although a tilt state of the electronic device 2000 is changed, an error in the determined relative location is relatively smaller than FIG. 18.

The above-mentioned embodiments are exemplified as the processor 2600 determines a relative location of a target device according to the AOA function using an LUT corresponding to one of an antenna state, a tilt state, or a cover state of the electronic device 2000. However, embodiments are not limited thereto. For example, the processor 2600 may verify each of an antenna state, a tilt state, and a cover state of the electronic device 2000 and may execute the AOA function using an LUT corresponding to the verified state.

Figure 16:
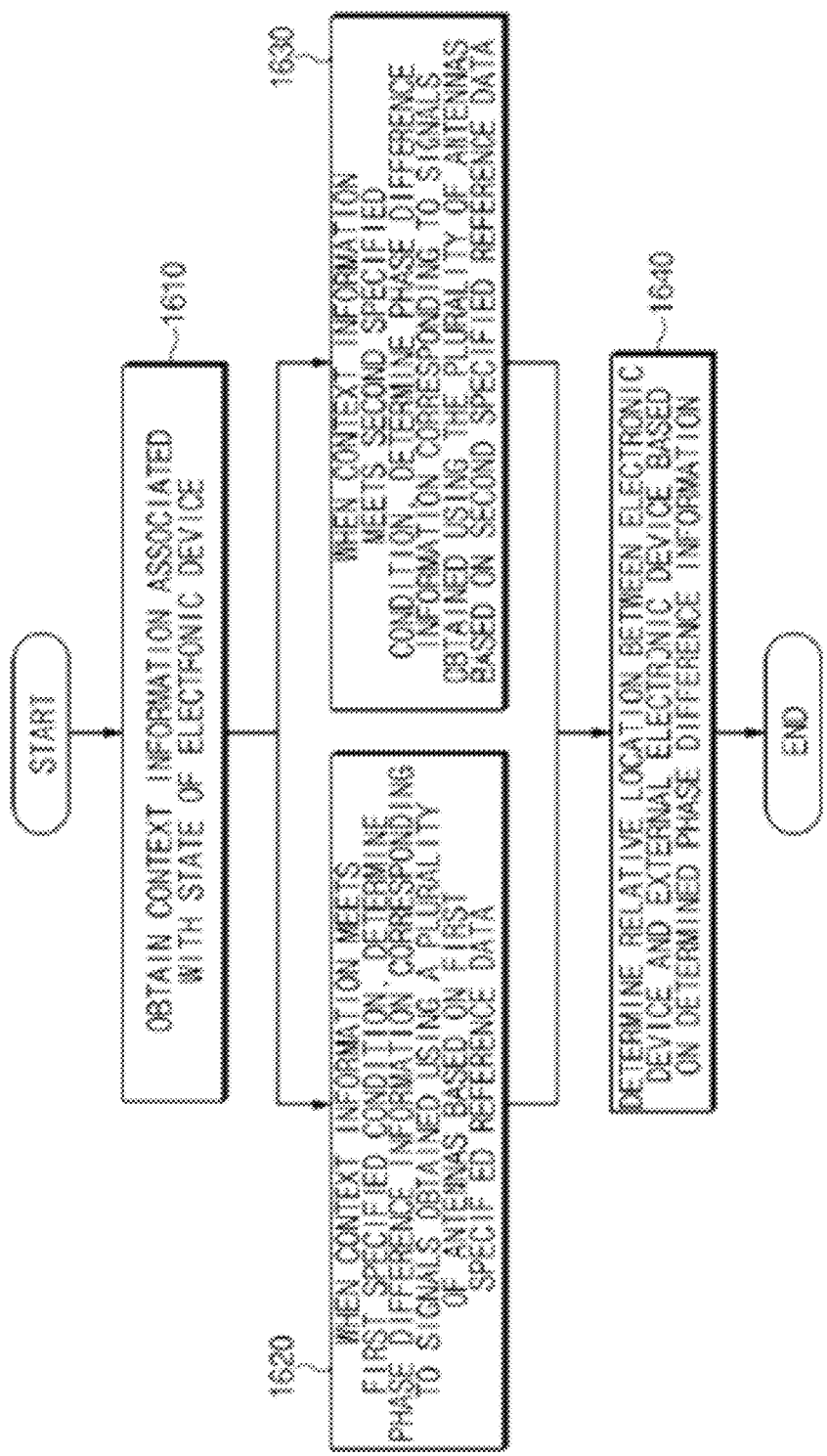
FIG. 16 is a flowchart illustrating a method for determining a relative location corresponding to a state of an electronic device according to an embodiment.

FIG. 16 is a flowchart illustrating a method for determining a relative location corresponding to a state of an electronic device according to an embodiment.

In operation 1610, a processor (e.g., a processor 2600 of FIG. 2) may obtain context information associated with a state of an electronic device (e.g., an electronic device 2000 of FIG. 2).

In operation 1620, when the context information meets a first specified condition, the processor 2600 may determine phase difference information corresponding to signals obtained using a plurality of antennas (e.g., a plurality of antennas 2210, 2220, and 2230 of FIG. 4) based on first specified reference data.

In operation 1630, when the context information meets a second specified condition, the processor 2600 may determine phase difference information corresponding to signals obtained using the plurality of antennas 2210, 2220, and 2230 based on second specified reference data.

In operation 1640, the processor 2600 may determine a relative location between the electronic device 2000 and an external electronic device (e.g., a target device 1000 of FIG. 1) based on the determined phase difference information.

A control method of an electronic device by at least one processor, the method includes when an AOA function is executed, verifying an event associated with a state of the electronic device; obtaining an LUT corresponding to the state of the electronic device among a plurality of LUTs stored in a memory of the electronic device; verifying a phase difference between first to third signals which are transmitted from another electronic device and are received using first to third antennas included in the electronic device; determining a relative location of the other electronic device with respect to the electronic device corresponding to the phase difference between the first to third signals, based on phase difference information included in the obtained LUT; and storing the determined relative location.

The method further includes outputting the determined relative location on a display of the electronic device.

The state of the electronic device comprises at least one of a state where at least one of the first to third antennas is connected, a tile of the electronic device, or a state of a cover combined with the electronic device.

When at least one of the third to third antennas is a shared antenna shared for another communication, the plurality of LUTs comprise a plurality of second LUTs corresponding to different states of the shared antenna, the different states being changed to correspond to each of a plurality of frequency bands used for the other communication, wherein the verifying of the event comprises verifying a state of the shared antenna, and wherein the obtaining comprises: obtaining an LUT corresponding to the verified state of the shared antenna among the plurality of second LUTs.

The method further includes verifying whether a state of the shared antenna is changed; and obtaining an LUT corresponding to the changed state of the shared antenna among the plurality of second LUTs.

Figure 17:
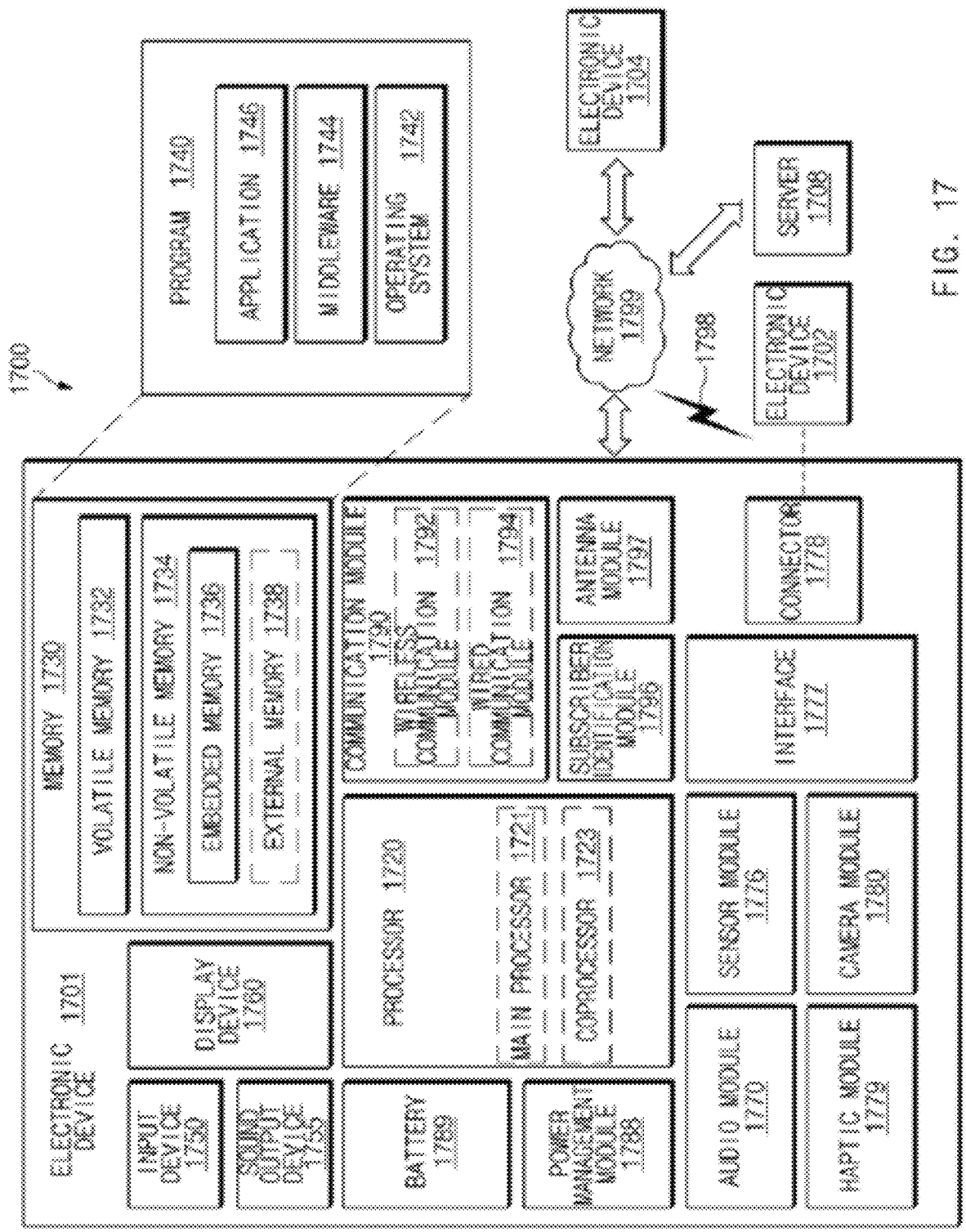
FIG. 17 is a block diagram of an electronic device 1701 in a network environment 1700 according to various embodiments.

FIG. 17 is a block diagram of an electronic device 1701 in a network environment 1700 according to various embodiments. Referring to FIG. 17, the electronic device 1701 may communicate with an electronic device 1702 through a first network 1798 (e.g., a short-range wireless communication) or may communicate with an electronic device 1704 or a server 1708 through a second network 1799 (e.g., a long-distance wireless communication) in the network environment 1700. According to an embodiment, the electronic device 1701 may communicate with the electronic device 1704 through the server 1708. According to an embodiment, the electronic device 1701 may include a processor 1720, a memory 1730, an input device 1750, a sound output device 1755, a display device 1760, an audio module 1770, a sensor module 1776, an interface 1777, a haptic module 1779, a camera module 1780, a power management module 1788, a battery 1789, a communication module 1790, a subscriber identification module 1796, and an antenna module 1797. According to some embodiments, at least one (e.g., the display device 1760 or the camera module 1780) among components of the electronic device 1701 may be omitted or other components may be added to the electronic device 1701. According to some embodiments, some components may be integrated and implemented as in the case of the sensor module 1776 (e.g., a fingerprint sensor, an iris sensor, or an illuminance sensor) embedded in the display device 1760 (e.g., a display).

The processor 1720 may operate, for example, software (e.g., a program 1740) to control at least one of other components (e.g., a hardware or software element) of the electronic device 1701 connected to the processor 1720 and may process and compute a variety of data. The processor 1720 may load a command set or data, which is received from other components (e.g., the sensor module 1776 or the communication module 1790), into a volatile memory 1732, may process the loaded command or data, and may store result data into a nonvolatile memory 1334. According to an embodiment, the processor 1720 may include a main processor 1721 (e.g., a central processing unit or an application processor) and a co-processor 1323 (e.g., a graphic processing device, an image signal processor, a sensor hub processor, or a communication processor), which operates independently from the main processor 1721, additionally or alternatively uses less power than the main processor 1721, or is specified to a designated function. In this case, the co-processor 1323 may operate separately from the main processor 1721 or embedded.

In this case, the coprocessor 1723 may control, for example, at least some of functions or states associated with at least one component (e.g., the display device 1760, the sensor module 1776, or the communication module 1790) among the components of the electronic device 1701 instead of the main processor 1721 while the main processor 1721 is in an inactive (e.g., sleep) state or together with the main processor 1721 while the main processor 1721 is in an active (e.g., an application execution) state. According to an embodiment, the co-processor 1323 (e.g., the image signal processor or the communication processor) may be implemented as a part of another component (e.g., the camera module 1780 or the communication module 1790) that is functionally related to the co-processor 1323. The memory 1730 may store a variety of data used by at least one component (e.g., the processor 1720 or the sensor module 1776) of the electronic device 1701, for example, software (e.g., the program 1740) and input data or output data with respect to commands associated with the software. The memory 1730 may include the volatile memory 1732 or the nonvolatile memory 1734.

The program 1740 may be stored in the memory 1730 as software and may include, for example, an operating system 1742, a middleware 1744, or an application 1746.

The input device 1750 may be a device for receiving a command or data, which is used for a component (e.g., the processor 1720) of the electronic device 1701, from an outside (e.g., a user) of the electronic device 1701 and may include, for example, a microphone, a mouse, or a keyboard.

The sound output device 1755 may be a device for outputting a sound signal to the outside of the electronic device 1701 and may include, for example, a speaker used for general purposes, such as multimedia play or recordings play, and a receiver used for receiving calls. According to an embodiment, the receiver and the speaker may be either integrally or separately implemented.

The display device 1760 may be a device for visually presenting information to the user and may include, for example, a display, a hologram device, or a projector and a control circuit for controlling a corresponding device. According to an embodiment, the display device 1760 may include a touch circuitry or a pressure sensor for measuring an intensity of pressure on the touch.

The audio module 1770 may convert a sound and an electrical signal in dual directions. According to an embodiment, the audio module 1770 may obtain the sound through the input device 1750 or may output the sound through an external electronic device (e.g., the electronic device 1702 (e.g., a speaker or a headphone)) wired or wirelessly connected to the sound output device 1755 or the electronic device 1701.

The sensor module 1776 may generate an electrical signal or a data value corresponding to an operating state (e.g., power or temperature) inside or an environmental state outside the electronic device 1701. The sensor module 1776 may include, for example, a gesture sensor, a gyro sensor, a barometric pressure sensor, a magnetic sensor, an acceleration sensor, a grip sensor, a proximity sensor, a color sensor, an infrared sensor, a biometric sensor, a temperature sensor, a humidity sensor, or an illuminance sensor.

The interface 1777 may support a designated protocol wired or wirelessly connected to the external electronic device (e.g., the electronic device 1702). According to an embodiment, the interface 1777 may include, for example, an HDMI (high-definition multimedia interface), a USB (universal serial bus) interface, an SD card interface, or an audio interface.

A connection terminal 1778 may include a connector that physically connects the electronic device 1701 to the external electronic device (e.g., the electronic device 1702), for example, an HDMI connector, a USB connector, an SD card connector, or an audio connector (e.g., a headphone connector).

The haptic module 1779 may convert an electrical signal to a mechanical stimulation (e.g., vibration or movement) or an electrical stimulation perceived by the user through tactile or kinesthetic sensations. The haptic module 1779 may include, for example, a motor, a piezoelectric device, or an electric stimulator.

The camera module 1780 may shoot a still image or a video image. According to an embodiment, the camera module 1780 may include, for example, at least one lens, an image sensor, an image signal processor, or a flash.

The power management module 1788 may be a module for managing power supplied to the electronic device 1701 and may serve as at least a part of a power management integrated circuit (PMIC).

The battery 1789 may be a device for supplying power to at least one component of the electronic device 1701 and may include, for example, a non-rechargeable (primary) battery, a rechargeable (secondary) battery, or a fuel cell.

The communication module 1790 may establish a wired or wireless communication channel between the electronic device 1701 and the external electronic device (e.g., the electronic device 1702, the electronic device 1704, or the server 1708) and support communication execution through the established communication channel. The communication module 1790 may include at least one communication processor operating independently from the processor 1720 (e.g., the application processor) and supporting the wired communication or the wireless communication. According to an embodiment, the communication module 1790 may include a wireless communication module 1792 (e.g., a cellular communication module, a short-range wireless communication module, or a GNSS (global navigation satellite system) communication module) or a wired communication module 1794 (e.g., an LAN (local area network) communication module or a power line communication module) and may communicate with the external electronic device using a corresponding communication module among them through the first network 1798 (e.g., the short-range communication network such as a Bluetooth, a WiFi direct, or an IrDA (infrared data association)) or the second network 1799 (e.g., the long-distance wireless communication network such as a cellular network, an internet, or a computer network (e.g., LAN or WAN)). The above-mentioned various communication modules 1790 may be implemented into one chip or into separate chips, respectively.

According to an embodiment, the wireless communication module 1792 may identify and authenticate the electronic device 1701 using user information stored in the subscriber identification module 1796 in the communication network.

The antenna module 1797 may include one or more antennas to transmit or receive the signal or power to or from an external source. According to an embodiment, the communication module 1790 (e.g., the wireless communication module 1792) may transmit or receive the signal to or from the external electronic device through the antenna suitable for the communication method.

Some components among the components may be connected to each other through a communication method (e.g., a bus, a GPIO (general purpose input/output), an SPI (serial peripheral interface), or an MIPI (mobile industry processor interface)) used between peripheral devices to exchange signals (e.g., a command or data) with each other.

According to an embodiment, the command or data may be transmitted or received between the electronic device 1701 and the external electronic device 1704 through the server 1708 connected to the second network 1799. Each of the electronic devices 1702 and 1704 may be the same or different types as or from the electronic device 1701. According to an embodiment, all or some of the operations performed by the electronic device 1701 may be performed by another electronic device or a plurality of external electronic devices. When the electronic device 1701 performs some functions or services automatically or by request, the electronic device 1701 may request the external electronic device to perform at least some of the functions related to the functions or services, in addition to or instead of performing the functions or services by itself. The external electronic device receiving the request may carry out the requested function or the additional function and transmit the result to the electronic device 1701. The electronic device 1701 may provide the requested functions or services based on the received result as is or after additionally processing the received result. To this end, for example, a cloud computing, distributed computing, or client-server computing technology may be used.

The term "module" as used in the present disclosure may represent, for example, a unit including one or more combinations of hardware, software and firmware. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to an embodiment of the present disclosure may be, for example, implemented by instructions stored in a computer-readable storage media in the form of a program module. The instruction, when executed by a processor 1720, may cause the one or more processors to perform a function corresponding to the instruction. The computer-readable storage media, for example, may be the memory 1730.

A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and hardware devices (e.g., a read only memory (ROM), a random access memory (RAM), or a flash memory). Also, a program instruction may include not only a mechanical code such as generated by a compiler but also a high-level language code executable on a computer using an interpreter. The above hardware unit may be configured to operate via one or more software modules for performing an operation according to an embodiment of the present disclosure, and vice versa.

A module or a program module according to an embodiment of the present disclosure may include at least one of the above elements, or a part of the above elements may be omitted, or additional other elements may be further included. Operations performed by a module, a program module, or other elements may be executed sequentially, in parallel, repeatedly, or in a heuristic method. In addition, some operations may be executed in different sequences or may be omitted. Alternatively, other operations may be added.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device, comprising:
   first to third antennas;
   a memory storing a plurality of look-up tables (LUTs); and
   a processor electrically connected with the first to third antennas and the memory and configured to:
   when an angle of arrival (AOA) function is executed, verify an event associated with a state of the electronic device;
   obtain an LUT corresponding to the verified state of the electronic device among the plurality of LUTs stored in the memory;
   obtain a phase difference between first to third signals transmitted from another electronic device and received using the first to third antennas;

determine a relative location of the other electronic device with respect to the electronic device corresponding to the phase difference between the first to third signals, based on phase difference information included in the obtained LUT; and store the determined relative location in the memory.

2. The electronic device of claim 1, further comprising a display, wherein the processor is configured to output the determined relative location on the display.

3. The electronic device of claim 1, wherein the state of the electronic device comprises at least one of a state where at least one of the first to third antennas is connected, a tile of the electronic device, or a state of a cover combined with the electronic device.

4. The electronic device of claim 1, wherein:

at least one of the first to third antennas comprises a shared antenna, a plurality of tuning circuits configured to change a state of at least one of a length or impedance of the shared antenna to respectively correspond to a plurality of frequency bands; and a switching device configured to selectively connect the shared antenna to one tuning circuit corresponding to one frequency band among the plurality of tuning circuits, the shared antenna is configured to simultaneously receive a signal associated with the AOA function and a second signal, the second signal comprises a signal transmitted in the one frequency band used for another communication among the plurality of frequency bands for the other communication, the plurality of LUTs comprise a plurality of first LUTs respectively corresponding to a plurality of states of the shared antenna connected to each of the plurality of tuning circuits, and the processor is further configured to:

when the AOA function is executed, verify that the shared antenna is connected with the one tuning circuit; and obtain an LUT corresponding to a state of the shared antenna connected with the one tuning circuit among the plurality of first LUTs.

5. The electronic device of claim 4, wherein the processor is further configured to, when verifying that the shared antenna is connected to another tuning circuit for changing a state of the shared antenna to correspond to another of the plurality of frequency bands, obtain an LUT corresponding to the state of the shared antenna connected to the another tuning circuit among the plurality of first LUTs.

6. The electronic device of claim 1, wherein:

at least one of the first to third antennas comprises a shared antenna, a first tuning circuit for the AOA function, at least one second tuning circuit for another communication using a plurality of frequency bands, and a switching device configured to selectively connect the shared antenna to one of the first tuning circuit and the at least one second tuning circuit, and the processor is further configured to:

when the AOA function is executed, verify whether the shared antenna is connected to the first tuning circuit; and when the shared antenna is not connected to the first tuning circuit, control the switching device such that the shared antenna is connected to the first tuning circuit.

7. The electronic device of claim 6, wherein:

the plurality of LUTs comprise a plurality of LUTs corresponding to (i) at least one of a plurality of tilts of the electronic device or a plurality of covers connected to the electronic device and (ii) a state where the shared antenna is connected to the first tuning circuit, and the processor is further configured to:

when the shared antenna is connected to the first tuning circuit, verify at least one of a tilt of the electronic device or a cover combined with the electronic device; and obtain an LUT corresponding to the at least one verified state of the electronic device among the plurality of LUTs.

8. The electronic device of claim 1, further comprising a sensor configured to sense a tilt of the electronic device, wherein:

the plurality of LUTs comprise a plurality of second LUTs respectively corresponding to a plurality of tilts of the electronic device, and the processor is further configured to:

when the AOA function is executed, verify a tilt of the electronic device using the sensor; and obtain an LUT corresponding to the verified tilt among the plurality of second LUTs.

9. The electronic device of claim 1, further comprising:

at least one cover configured to cover at least a portion of the electronic device, the at least one cover including a tag including a cover identifier; and a reader configured to read the cover identifier stored in the tag, wherein: the plurality of LUTs comprise at least one third LUT respectively corresponding to the at least one cover, the at least one third LUT being determined using a phase difference between the first to third signals verified in a state where the electronic device is combined with the at least one cover, and the processor is further configured to:

when the AOA function is executed, verify the cover identifier obtained from the tag using the reader; and obtain an LUT corresponding to the verified cover identifier among the at least one third LUT.

10. A control method of an electronic device executed by at least one processor, the method comprising:

when an AOA function is executed, verifying, by the at least one processor, an event associated with a state of the electronic device;

obtaining, by the at least one processor, a LUT corresponding to the state of the electronic device among a plurality of LUTs stored in a memory of the electronic device;

verifying, by the at least one processor, a phase difference between first to third signals transmitted from another electronic device and received using first to third antennas included in the electronic device;

determining, by the at least one processor, a relative location of the other electronic device with respect to the electronic device corresponding to the phase difference between the first to third signals based on phase difference information included in the obtained LUT; and storing, by the at least one processor, the determined relative location.

11. The method of claim 10, further comprising outputting, by the at least one processor, the determined relative location on a display of the electronic device.

12. The method of claim 10, wherein the state of the electronic device comprises at least one of a state where at least one of the first to third antennas is connected, a tile of the electronic device, or a state of a cover combined with the electronic device.

13. The method of claim 10, wherein:
when at least one of the first to third antennas is a shared antenna shared for another communication, the plurality of LUTs comprise a plurality of second LUTs corresponding to different states of the shared antenna, the different states being changed to correspond to each of a plurality of frequency bands used for the other communication,
the verifying of the event comprises verifying a state of the shared antenna, and
the obtaining comprises obtaining an LUT corresponding to the verified state of the shared antenna among the plurality of second LUTs.

14. The method of claim 13, further comprising:
verifying, by the at least one processor, whether a state of the shared antenna is changed; and
obtaining, by the at least one processor, an LUT corresponding to the changed state of the shared antenna among the plurality of second LUTs.

* * * * *